(12) United States Patent
Schneider et al.

(10) Patent No.: US 10,866,625 B2
(45) Date of Patent: Dec. 15, 2020

(54) DATA RATE ADAPTIVE LINK SPEED CONFIGURATION FOR CONNECTION BETWEEN HOST PROCESSOR AND MODEM

(71) Applicant: Intel Corporation, Santa Clara, CA (US)

(72) Inventors: Reinhold Schneider, Veitsbronn (DE); Pavel Peleska, Graefelfing (DE)

(73) Assignee: Intel Corporation, Santa Clara, CA (US)

( * ) Notice: Subject to any disclaimer, the term of this patent is extended or adjusted under 35 U.S.C. 154(b) by 65 days.

(21) Appl. No.: 16/228,505

(22) Filed: Dec. 20, 2018

(65) Prior Publication Data

US 2019/0121417 A1    Apr. 25, 2019

(51) Int. Cl.
| | | |
|---|---|---|
| *G06F 1/00* | (2006.01) | |
| *G06F 1/3212* | (2019.01) | |
| *H04L 12/12* | (2006.01) | |
| *H04W 52/02* | (2009.01) | |
| *H04W 28/02* | (2009.01) | |

(52) U.S. Cl.
CPC ............ *G06F 1/3212* (2013.01); *H04L 12/12* (2013.01); *H04W 28/0221* (2013.01); *H04W 52/0216* (2013.01); *H04W 52/0229* (2013.01)

(58) Field of Classification Search
CPC .. G06F 1/3212; H04L 12/12; H04W 28/0221; H04W 52/0216; H04W 52/0229
See application file for complete search history.

(56) References Cited

U.S. PATENT DOCUMENTS

2008/0101476 A1*    5/2008    Tian ................... H04N 19/152
375/240.26

* cited by examiner

*Primary Examiner* — Nitin C Patel
(74) *Attorney, Agent, or Firm* — Alliance IP, LLC

(57) ABSTRACT

First data is transmitted from a modem of a device to a processor of the device over a point-to-point serial data link at a first one of a plurality of link speeds, where the first data is received at the device over a wireless network connection. The data link transitions to an inactive state following transmission of the first data. Second data is identified that has likewise been received over a wireless network connection, where at least a portion of the second data is received at the device while the data link is in the inactive state. A change from the first speed to a second one of the plurality of link speeds is determined based on historical parameters and predictive parameters. The data link is transitioned to an active state operational at the second link speed to transmit the second data to the processor over the data link.

20 Claims, 11 Drawing Sheets

DATA RATE ADAPTIVE LINK SPEED CONFIGURATION FOR CONNECTION BETWEEN HOST PROCESSOR AND MODEM

FIELD

This disclosure pertains to improvements to the operation of computing systems, and in particular (but not exclusively) to power management in point-to-point data links.

BACKGROUND

As a result of the greater ability to fit more processing power in smaller packages, smaller computing devices have increased in popularity. Smartphones, tablets, ultrathin notebooks, and other user equipment have grown exponentially. However, such devices may be nonetheless be constrained in some aspects due to the smaller formfactor of such devices, including the size and capacity of batteries used to power such device. Further, interconnects have grown from more traditional multi-drop buses that primarily handled electrical communications to full blown interconnect architectures that facilitate fast communication. Interconnect technologies may also be applied within the smaller formfactor, mobile computing devices. For each of such platforms, as the demand for future processors to consume at even higher-rates increases, corresponding demand is placed on the capabilities of interconnect architectures.

DETAILED DESCRIPTION

Figure 1:
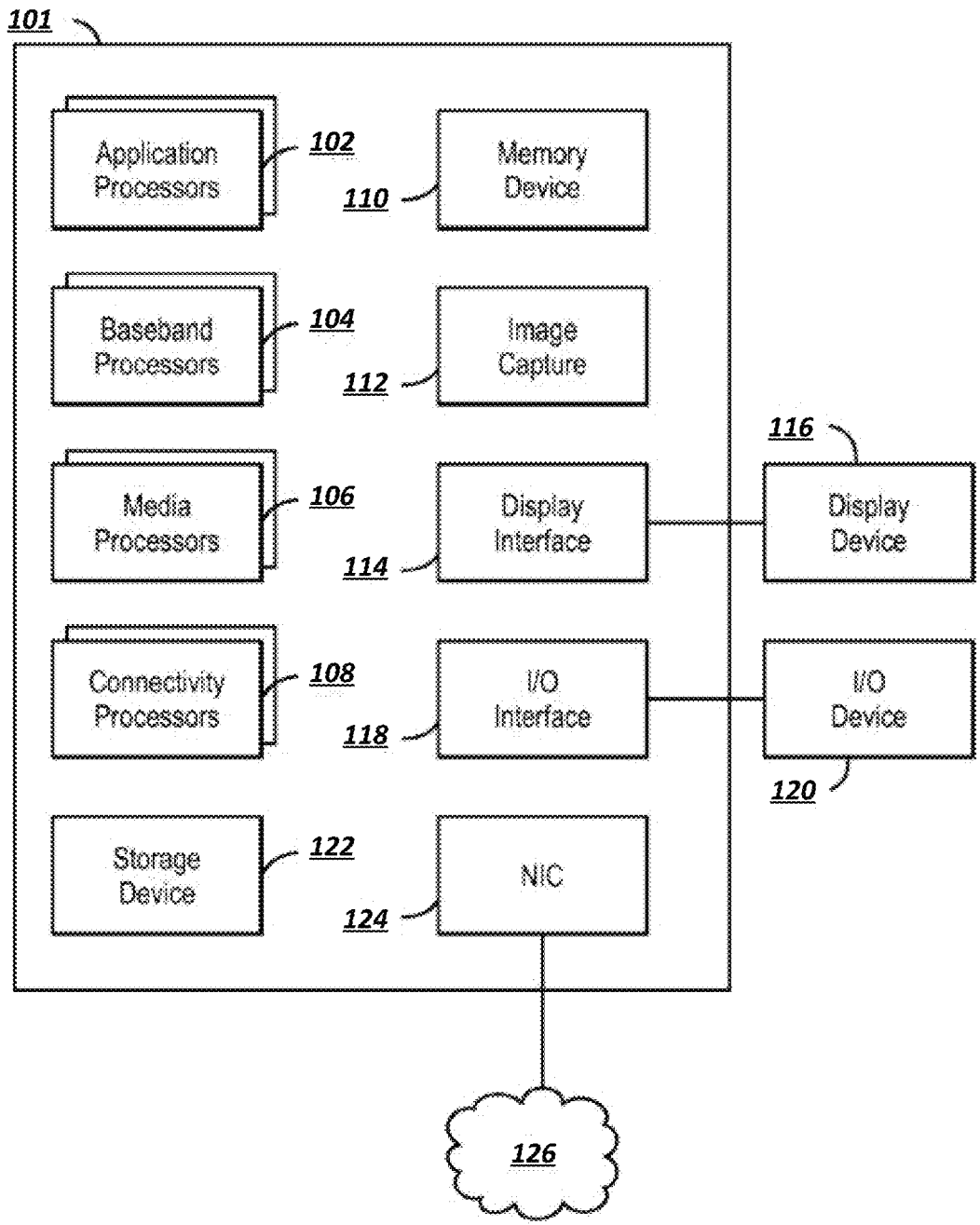
FIG. 1 is a block diagram illustrating an example embodiment of a computing system.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to link speed management and efficiency in specific computing systems, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard, Rack Scale, and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, some well-known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the subject matter of the present disclosure.

Computing devices, such as smartphones and tablets can use communication links established according to various interconnect protocols, including PCIe and other protocols such as those explicitly and implicitly referenced in this disclosure. FIG. 1 is a block diagram 100 of a an example mobile computing device 101 which may be enhanced, as discussed herein, to support dynamic link speed changes. The computing device 101 may be, for example, a smartphone, laptop, ultrabook, tablet, wearable device, Internet of Things (IoT) device, mobile phone, among other examples. The computing device 101 may include an application processor 102, baseband processor 104, media processors 106, and a connectivity processor 108. The application processors 102 may be used to execute an operating system and various applications software. In embodiments, the application processors 102 may also perform processing related to the user interfaces and data networking functions. The basebands processors 104 are typically tasked only with the execution of processing related to the actual communication over the radio, transmitters, receivers, and transceivers of the computing device. Accordingly, a modem processor may be a baseband processor 104.

A media processor 106 may be configured to interface to a high speed input/output subsystem that is configured to render or manipulate graphics images, graphics frames, videos, or the like, to be displayed to a user of the computing device 100. The connectivity processor 108 may enable general cellular network connectivity as provided by wireless carriers, such as that provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) that is not cellular may also be enabled, and can include personal area networks (such as Bluetooth, Near Field, etc.), local area networks (such as Wi-Fi), and/or wide area networks (such as WiMax), or other wireless communication. The processors described herein may be single core processors, multi-core processors, a computing cluster, or any number of other configurations. Furthermore, the computing device 101 may include more than one of each processor, and also other processors that are not described herein. While the application processors 102, baseband processors, media processors 106, and connectivity processor 108 are described as performing distinct functions, each processor can perform any of the functions described herein, and also functions not described herein. The description of the processors is for ease of description and should not be viewed as limiting.

In embodiments, an application processor 102 and a modem processor 104 communicate via a serial, point-to-point data link. The computing device 101 may also include a memory device 110 that stores instructions that are executable by the other processors. The memory device 110 can include random access memory (RAM), read only memory (ROM), flash memory, or any other suitable memory systems. For example, the memory device 110 may include dynamic random access memory (DRAM). The computing device 101 includes an image capture mechanism 112. In some embodiments, the image capture mechanism 112 is a camera, stereoscopic camera, scanner, infrared sensor, or the like.

The computing device 101 may also include a display interface 114 configured to connect the computing device 101 to a display device 116. The display device 116 may include a display screen that is a built-in component of the computing device 100. The display device 116 may also include a computer monitor, television, or projector, among others, that is externally connected to the computing device 100. Further, the computing device 101 may also include an input/output (I/O) device interface 118 configured to connect the computing device 101 to one or more I/O devices 120. The I/O devices 120 may include, for example, a keyboard and a pointing device, wherein the pointing device may include a touchpad or a touchscreen, among others. The I/O devices 120 may be built-in components of the computing device 100, or may be devices that are externally connected to the computing device 100.

The computing device 101 also includes a storage device 122. The storage device 122 is a physical memory such as a hard drive, an optical drive, a thumbdrive, an array of drives, or any combinations thereof. The storage device 122 may also include remote storage drives. The computing device 101 may also include a network interface controller (NIC) 124 may be configured to connect the computing device 101 to a network 126. The network 126 may be a wide area network (WAN), local area network (LAN), or the Internet, among others.

The block diagram of FIG. 1 is not intended to indicate that the computing device 101 is to include all of the components shown in FIG. 1. Further, the computing device 101 may include any number of additional components not shown in FIG. 1, depending on the details of the specific implementation.

Figure 2:
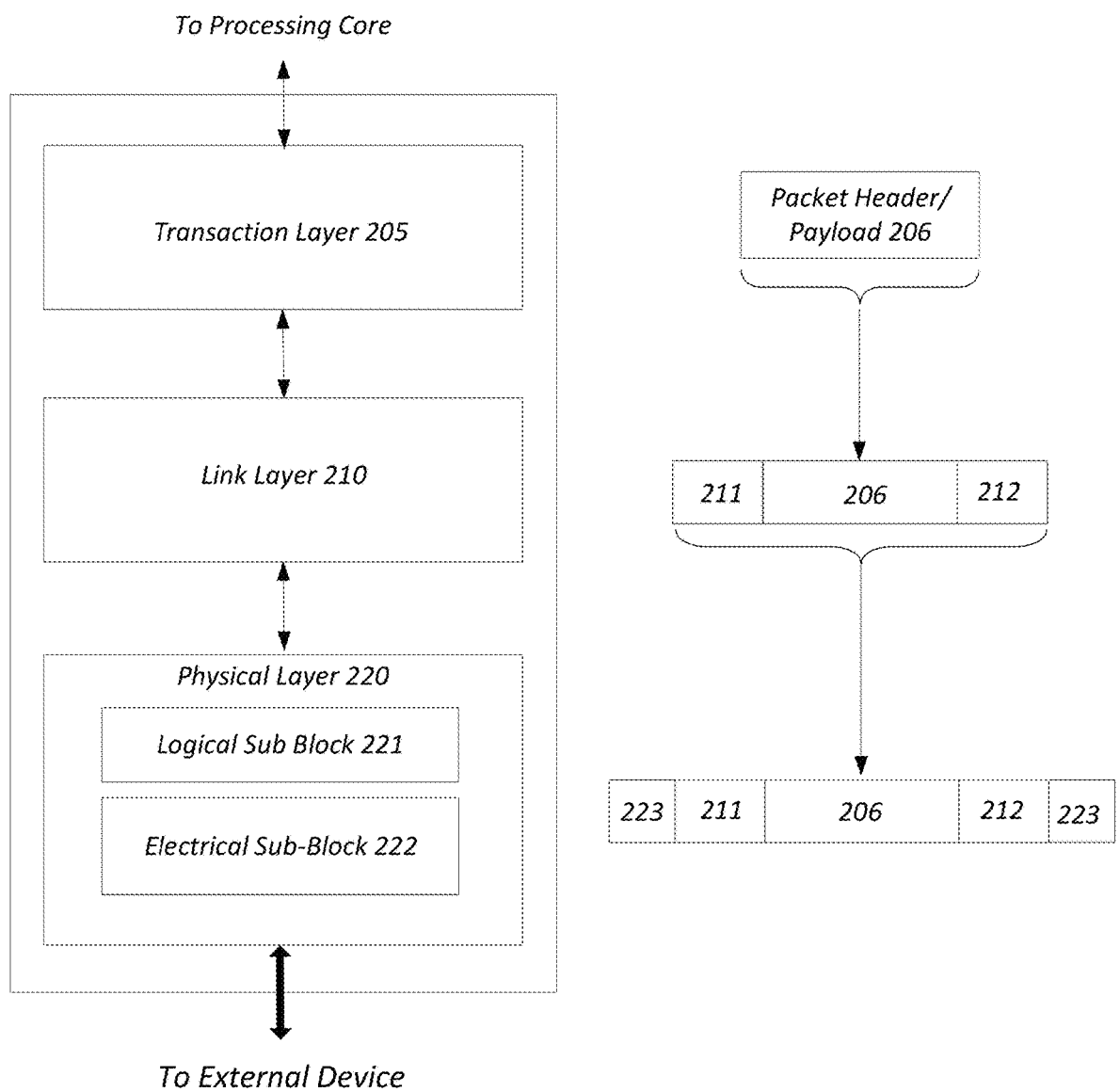
FIG. 2 illustrates an embodiment of a interconnect architecture including a layered stack.
Figure 3:
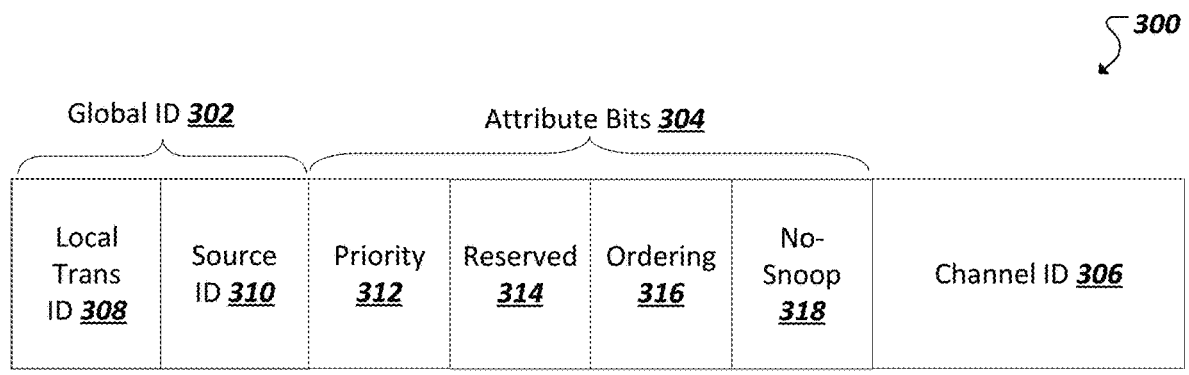
FIG. 3 illustrates an embodiment of a request or packet to be generated or received within an interconnect architecture.
Figure 4:
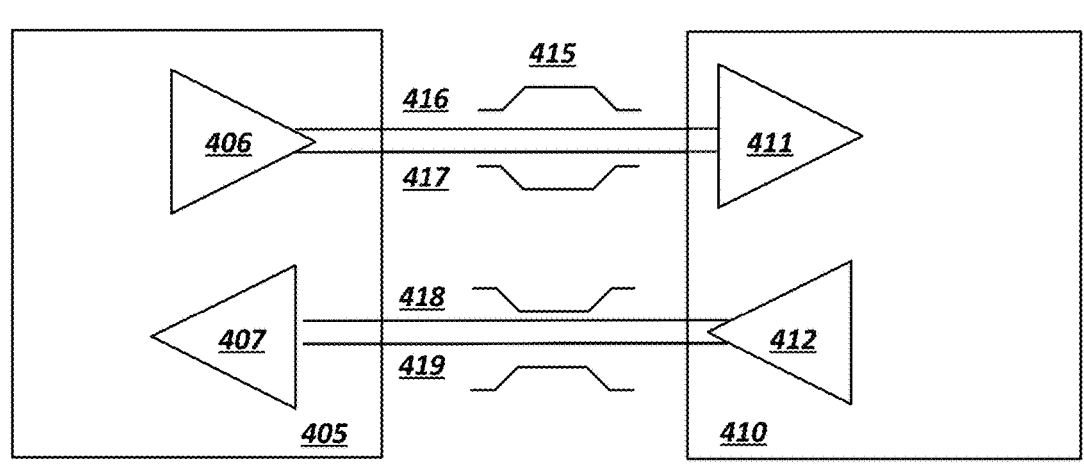
FIG. 4 illustrates an embodiment of a transmitter and receiver pair for an interconnect architecture.

Turning to FIG. 2 an embodiment of a layered protocol stack is illustrated, which may be implemented in one or more components of a mobile computing device, such as an application processor or baseband processor or modem, among other examples. Layered protocol stack 200 includes logic implemented in hardware circuitry and/or software to implement any form of a layered communication stack, such as a Quick Path Interconnect (QPI) stack, a PCIe stack, a next generation high performance computing interconnect stack, or other layered stack. Although the discussion immediately below in reference to FIGS. 2-4 are in relation to a PCIe stack, similar concepts may be applied to other interconnect stacks, such as OpenCAPI™, Gen-Z™, UPI, Universal Serial Bus, (USB), Cache Coherent Interconnect for Accelerators (CCIX™), Advanced Micro Device™'s (AMD™) Infinity™, Common Communication Interface (CCI), or Qualcomm™'s Centrig™ interconnect, among others. In one embodiment, protocol stack 200 is a PCIe protocol stack including transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

PCI Express uses packets to communicate information between components. Packets are formed in the Transaction Layer 205 and Data Link Layer 210 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The translation layer 205 typically manages credit-based flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 205 assembles packet header/payload 206. Format for current packet headers/payloads may be found in the PCIe specification at the PCIe specification website.

Quickly referring to FIG. 3, an embodiment of a PCIe transaction descriptor is illustrated. In one embodiment, transaction descriptor 300 is a mechanism for carrying transaction information. In this regard, transaction descriptor 300 supports identification of transactions in a system. Other potential uses include tracking modifications of default transaction ordering and association of transaction with channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one embodiment, an 8b/10b transmission code is employed, where ten-bit symbols are transmitted/received. In other embodiments 128b/130b transmission coding is used, among other examples. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Referring next to FIG. 4, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 406/411 and a receive pair 412/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in a PCIe link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

In some implementations, a high-performance interconnect and corresponding interconnect protocol (e.g., such as a next generation PCIe-based interconnect) may be provided that is capable of operating at high speeds such as 25 GT/s and/or 32 GT/s. In one example, two speeds may be defined for the high performance interconnect, one at 25 GT/s and 32 GT/s, based on the characteristics determined for the channel (e.g., during link training). The interconnect, in one implementation, may be backwards compatible with existing PCIe generations and speeds provided for these generations (e.g., 8 GT/s, 16 GT/s, etc.).

Increasing interconnect link speeds, such as new generations of PCIe link speeds, may enable a variety of processing and performance advantages, but such improvements may not be cost free. For instance, higher speed links typically introduce additional complexity and sensitivity to properly train the link, as high speed links may be more susceptible to bit errors resulting from cross talk, jitter, and other link issues. Additionally, higher link speeds may result in more power-hungry communication links. Such power consumption issues may be particularly troublesome in computing systems with constrained power supplies or power usage requirements or policies. For instance, mobile computing platforms (e.g., handheld devices, smart phones, internet of things (IoT) devices, wearables, tablets, phablets, etc.) typically have smaller formfactors, which limit the battery size and capacity within such devices. Accordingly, it may be particularly beneficial for mobile computing platforms to use the battery provided energy as efficiently as possible to maximize battery life.

In some mobile computing platforms, one or more serial data links may be provided to interconnect components of the platform, including links coupling the application processor (or another microprocessor) with the baseband processor, modem, or other communication module facilitating wireless network connectivity of the platform. In some implementations, the data links may be implemented to support a PCIe-based protocol and specification. For instance, in some traditional modem platforms, a PCIe link may be used that is capable of supporting the communication of data received over wireless technologies (e.g., up to 4G), however the PCIe link is configured to operate at a fixed link speed, such as PCIe Generation 1 or Generation 2 speed (e.g., on a single lane), irrespective of the actual amount of data being received and handled through the modem.

As wireless communication technologies advance, the amount of data to be handled by connected devices is also expected to increase. For instance, in 5G devices much higher data rates are to be transferred via the modem to the host. Accordingly, the link coupling the modem to the host is to operate at a higher speed to accommodate these higher data rates. However, higher link speeds (e.g., PCIe speeds) consumer more power than at lower link speeds when the link is an active, or "on", state. In an effort to further reduce power consumption on links coupling a host to a communication module, such as a modem or baseband processor, an aggregation period may be defined for data to be transmitted over the link (e.g., from the communication module to the host processor). In such a regime, the link may toggle between a low power, or "off", state and the active link state, with an amount of data received over the air interface being buffered or aggregated during the aggregation period to be later sent the next time the link is reactivated. For instance, in traditional implementations of PCIe links connecting a communication module to an application processor of a mobile computing device, the link partners operate to cause the link to toggle between an L1 low power state (e.g., a PCIe L1.1 or L1.2 low power sub-state) and a power-hungry link on-state (L0). During the aggregation period, while the link is in the low power state, data arrives over the air interface and is being stored in modem memory. When the aggregation period expires, the PCIe link is activated to L0 and the aggregated data is delivered to the host memory at the set PCIe link speed. Such a scheme helps to save power at the PCIe link as it is being activated only for short periods corresponding to actual high-volume data transfers relative to the longer, low-power aggregation period. This scheme applies until the data rate fully saturates the PCIe link.

Accordingly, traditional implementations of an aggregation period set the link speed to the speed needed to support the highest possible data rate that may be experienced at the wireless transceiver of the mobile device. However, setting the link to operate at the highest possible data rate for each and every transmission of aggregated data is often much higher than is needed to transmit the amount of data that was actually aggregated at the modem of the device, as for many end user use cases, the amount of data received and sent over wireless networks is bursty and often much lower than the highest possible data rate. This issue is compounded as new and higher data rates are provided through emerging wireless communication technologies, among other example issues. For instance, with 5G, rates are expected to climb to multiples of gigabits per second. Accordingly, a single-speed link utilizing an aggregation period would need to set the link speed to a Gen3, Gen 4, or Gen 5 PCIe link speed to handle peak 5G data rates. However, such link speeds would be overkill when the amount of data communicated or wireless technology used is lower than provided in peak 5G data rates. On the other hand, settling for a lower link speed presents its own problem for high wireless data rates, as it may take multiple link transmissions to clear the data that accumulates in the aggregation period buffer when data is received at peak data rates. For instance, toggling between the low-power idle (L1.1/L1.2) and the active link on-state (L0) may take several microseconds before data can be transferred via the PCIe link, adding what could be unacceptable latency to the processing of data that is left to collect in the buffer over multiple aggregation periods. Indeed, for low to medium data rates, the time spent for activating the link can be considered unjustifiably long compared to the time needed to actually transfer the relatively small amount of data at the set high link speed—the time to activate the link may even exceed the time used to transmit the data at this high link speed. Power usage also becomes an issue when using excessive link speeds to transmit relatively small amounts of data, as the link engages in relatively high-power consumption from the activation (e.g., training) of the link through the data transfer time, among other example issues.

In an improved system implementation, a communication module, such as an enhanced modem or baseband processor device, may be implemented to support a data rate adaptive PCIe link speed configuration (e.g., based on PCIe link speeds) for delivering data from the modem to a host processor (e.g., an application processor). In such implementations, the link speed of the link coupling the communication module to the host processor may be dynamically adjusted based (at least partially) on the data rate of the device's wireless connection, so as to attempt to realize an optimal ratio between link activation and data transfer time to maximize power efficiency of the link. In some implementations, logic (implemented in hardware circuitry, firmware, and/or software of the communication module) may implement an algorithm, which allows for the prediction of the optimal link speed settings and enable adequate time for the link speed switching, to implement the example benefits identified above. Such a system may enable power optimized data delivery from 5G-enabled modems to corresponding host system over a broad range of use cases and related downlink data rates that helps to extend the system's battery life, among other example benefits and implementations.

Figure 5:
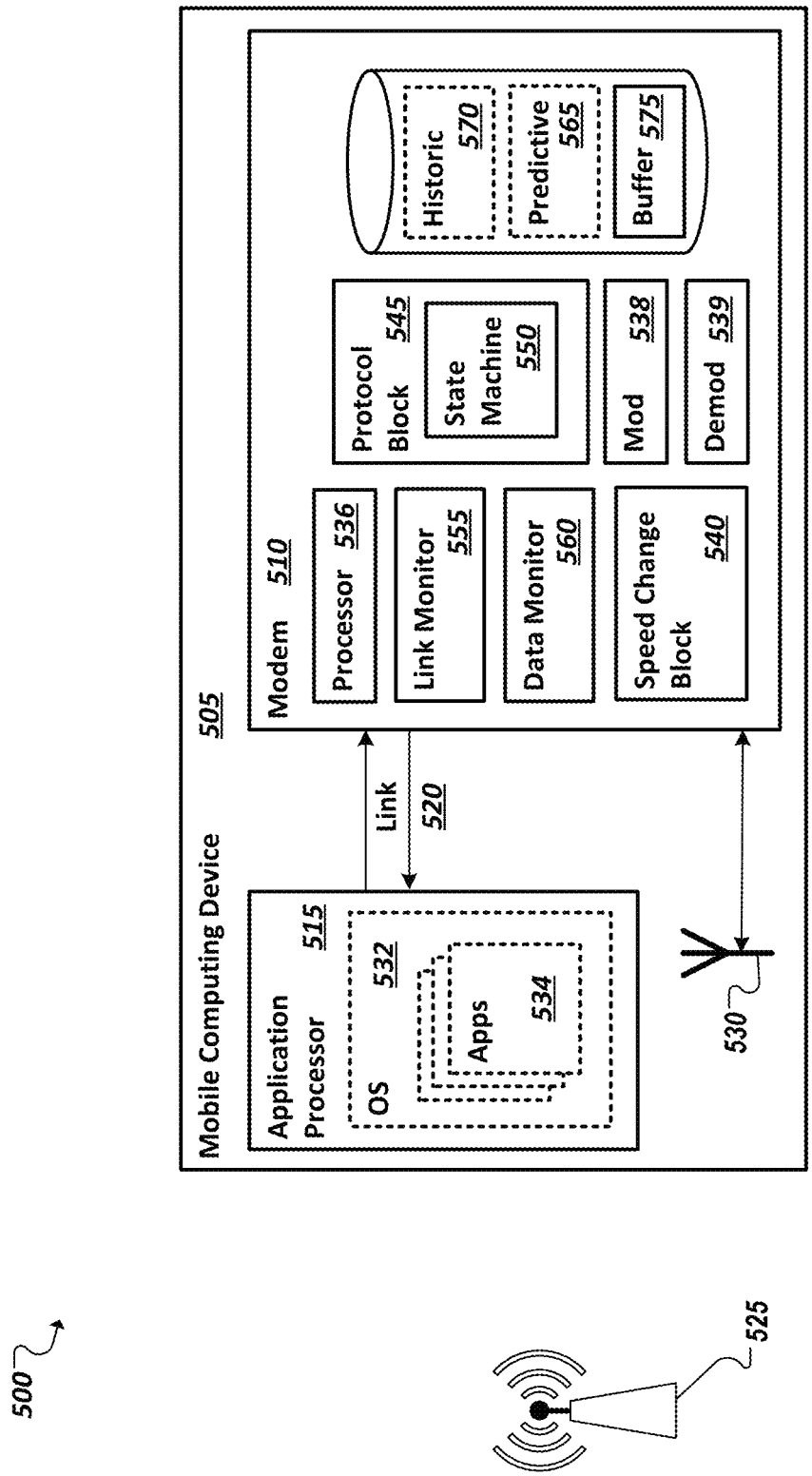
FIG. 5 is a simplified block diagram illustrating an example implementation of a mobile computing device.

Turning to FIG. 5, a simplified block diagram 500 is show illustrating an example mobile computing device 505 that includes functionality to connect to wireless networks such as cellular data networks, WiFi networks, and other local and wide area wireless networks. To enable communication over these wireless networks, the mobile computing device 505 may include a communication module, such as a baseband processor device or modem, that includes circuitry to modulate and/or demodulate signals to be sent or received over the wireless network. Such a communication module (referred to herein, for convenience, as a modem) may be coupled to one or more host processors of the mobile computing device, such as an application processor 515, using one or more point-to-point links 520. In some implementations, the link coupling the modem 510 to the application processor 515 may be a single lane link (i.e., with a single lane in each of the upstream and downstream directions). Communication between the modem 510 and application processor 515 may be according to a PCIe-based interconnect protocol. For instance, a set of multiple defined link speeds may be supported on the link (e.g., Gen 1, Gen 2, Gen 3, Gen 4, Gen 5 PCIe speeds, etc.), such that any one of the speeds may be theoretically set and used for communication over the link 520. Data communicated over the link may include data received from the wireless network (e.g., from a cellular transceiver or other access point 525) through the antenna 530 of the mobile communication device 505 and demodulated by demodulation circuitry 539 before sending from the modem 510 to the application processor, as well as data transmitted from the application processor 515 to the modem 510, which the modem 510 is to modulate (using modulation circuitry 538) and otherwise prepare for transmission over a wireless channel of the wireless network using antenna 530. In some implementations, an operating system 532 may be run on the application processor 515 and one or more applications 534 may run within the operation system 532—these and other components, software, and logic of the application processor 515 may consume data received over wireless connections with one or more networks (e.g., private and/or public networks (e.g., the Internet)), as well as generate data that is to be communicate by the mobile computing device 505 (using modem 510) to other remote systems using a wireless network connection, and so on.

In one example, a modem 510 may include one or more microprocessor devices to drive additional logic and components of the modem 510, such as a speed change recommendation block 540, protocol block 545 (which may include state machine logic 550 to handle state machine transitions defined in an interconnect protocol handled using the protocol block 545), modulation 538 and demodulation 539, a link monitor 555, a data monitor 560, among other example components providing additional functionality including blocks embodying hardware and/or software logic implementing portions or combinations of the functionality of the components introduced in the foregoing example. In some implementations, the modem 510 may additionally implement an aggregation period, such discussed above, where a buffer 575 is implemented in memory of the modem 510 to aggregate data that is ready to send to the application processor 515 over the link 520 during transmission windows, which are separated by durations where the link 520 is placed in a low-power inactive state. Such transmission windows and intervening low-power inactive states may be defined to occur according to a particular period or frequency or even dynamically adjustable periods. Protocol block 545 (e.g., through state machine logic 550) may be utilized to perform transitions between active link states and inactive links states including link training and signaling to coordinate the link state transitions between the modem 510 and the application processor 515 to realize the aggregation periods for the link 520. The application processor 515, in some instances, may similarly implement and maintain a buffer to aggregate data to be sent to the modem during active transmission windows on the link, as well as be equipped with supporting logic (e.g., interconnect protocol logic) to utilize such aggregation periods.

In some implementations, a modem 510 (and/or application processor 515) may be configured to implement an algorithm to intelligently and autonomously adjust the link speed applied to transmit data between the modem 510 and application processor 515 within an aggregation period scheme. In one example, the algorithm used to predict the necessary link speed may consider, as inputs, historical information concerning the link speeds used to send other prior data on the link 220, as well characteristics of this prior data, together with predictive inputs that foretell the likely amount of data that will be collected in a current or future aggregation period for sending across the link 220. In the example shown in FIG. 5, a speed change block 540 may include logic implemented in specialized hardware circuitry, firmware, and/or software resident on the modem device 510 to implement a dynamic and autonomous speed change functionality for the link based on historic and/or predictive inputs. Further, the modem 510 may include a link monitor 555 and data monitor 560, among other components to detect attributes of past, present, and future data to be communicated over the link 520. For instance, link monitor 555 may be provided, which is equipped with functionality to detect an amount of data sent in one or more prior data transmissions from the modem 510 to the application processor 515 together with the link speed used on the link 520 to transmit this data. Further, in some implementations, a link monitor 555 may be further configured to determine performance metrics for the transmission of this prior data to identify (e.g., to the speed change block 540) whether this previously employed link speed was adequate for sending this amount of data. For instance, the link monitor 555 may generate historic parameter data 570 to not only describe data and data speed used on the link 520, but also parameters and results indicating whether all of the data aggregated in the immediately preceding aggregation period was successfully transmitted during the next active link state window, the time required to transmit the aggregated data at the utilized link speed, whether the link speed differed from previous transmissions (e.g., to identify a pattern of link speeds used), and, if the link speed was the same as the immediately preceding link transmission, how the link performed vis-à-vis the preceding transmission, among other example inputs. Additionally, to provide context for these performance results, or to otherwise provide comparative context for use by the speed change block 540, in some instances, historic parameter data 570 may also identify, for each of the preceding transmissions to be considered, information describing attributes of the mobile computing device 505 at the time the corresponding data was aggregated, such as the data rates used to receive or transmit the data over the wireless network, the types of applications using or generating the data, among other information.

An example modem 510 may be further provided with a data monitor 560, which enables the modem to detect parameters at the modem and from incoming data received through antenna 530 that serve as clues for the speed change block 540 to predict whether a change in the link speed utilized at the link 520 is desirable. For instance, in an implementation of a PCIe link 520, several defined link speeds may be supported in accordance with the PCIe-based protocol used by the example link 520. For instance, Gen1, Gen 2, Gen 3, Gen 4, etc. speeds may each be supported using the interconnect protocol block on the modem 510 (and application processor 515). The data monitor 560 may be configured to monitor the data that is received at the device 505, as well as data that is to be sent by the device 505, to generate predictive parameter data 565, which may also be used (e.g., with historic parameter data 570) by the speed change block 540 to determine whether a link speed change should be triggered for the link 520 during an upcoming active link state transmission window. For instance, data monitor 560 may detect and record information pertaining to data to be aggregated in a current and subsequent aggregations periods such as the current wireless technology (and associated data rate) utilized by the mobile device 505 to communicate data over the wireless network (e.g., 3G, 4G, LTE, 5G, etc.), how many component carries and the frequency bandwidth currently used by the device 505 to communicate over the wireless network, information concerning the applications (e.g., 534) currently running on the device 505 and communicating data over the wireless channel, the time of day (e.g., with some times of day corresponding to higher, lower, more steady, more bursty, etc. data use by a user), settings employed at the mobile device (e.g., at the direction of the user, wireless service provider, etc.) that correspond with the likely data rate used for wireless communications (e.g., throttling policies or controls, low power or other battery savings user modes, the availability of WiFi or other substitute wireless connections that correspond to higher data rates or data use by a user, etc.), among other information, all of which may be stored in various, corresponding predictive parameter data 565.

In some implementations, the speed change block 540 may determine, from predictive parameter data 565 (and, in some cases, through comparisons with patterns identified (by the speed change block or link monitor) in historic parameter data 570) that data being aggregated during a current or subsequent aggregation period is or is to be received at a particular data rate. The speed change block 540 may additionally identify the data rate used to aggregate data that was transmitted in a preceding transmission over the link 520, and compare this previous data rate with the predicted data rate for upcoming data to be sent over the link 520. Based on this comparison, as well as, in some instances, performance data collected for the previous transmission, the speed change block 540 may determine that the link speed should either remain the same as in a preceding active link state transmission window or changed to a lower or higher speed defined according to a protocol supported by the link 520. Based on this determination by the speed change block 540, the protocol block 545 may reactivate the link to coincide with the end of the corresponding current (or a subsequent) aggregation period such that the determined appropriate link speed is applied at the link. This may allow the link speed to be adaptively tuned to most efficiently transmit the amount of data observed and/or predicted as needing to be sent over the link 520.

In the example of FIG. 5 discussed above, and in other examples discussed herein, it is contemplated that speed change logic may be implemented within a modem device, such that the modem provides recommendations as to what link speeds are to be employed on a link connecting the modem to a corresponding application processor. The application processor may react to speed change recommendations or requests of the modem and may, in some cases, initiate the speed change on a link responsive to the recommendations or requests of the modem. In other alternative implementations, at least a portion of the speed change logic may be implemented also or instead on the application processor, such that the application processor identifies speed change opportunities. Indeed, in some implementations, at least a portion of one or both of the historical parameter data and predictive parameter data may be generated at the application processor based on observations at the application processor (e.g., to be passed over to the modem's speed change block). In some implementations, the link connecting a modem and application processor may be bi-directional (e.g., with one lane for sending data from the modem to the application processor (in the upstream direction) and another lane for sending data from the application processor to the modem (in the downstream direction)). In some instances, the speed applied in the upstream direction of the link may be the same as the speed applied in the downstream direction. In alternative implementations, the link speeds may be different in the upstream and downstream directions (e.g., with the modem controlling determination of upstream link speeds, and the application processor controlling determination of the downstream link speed), among other potential alternative implementations.

Figure 6A:
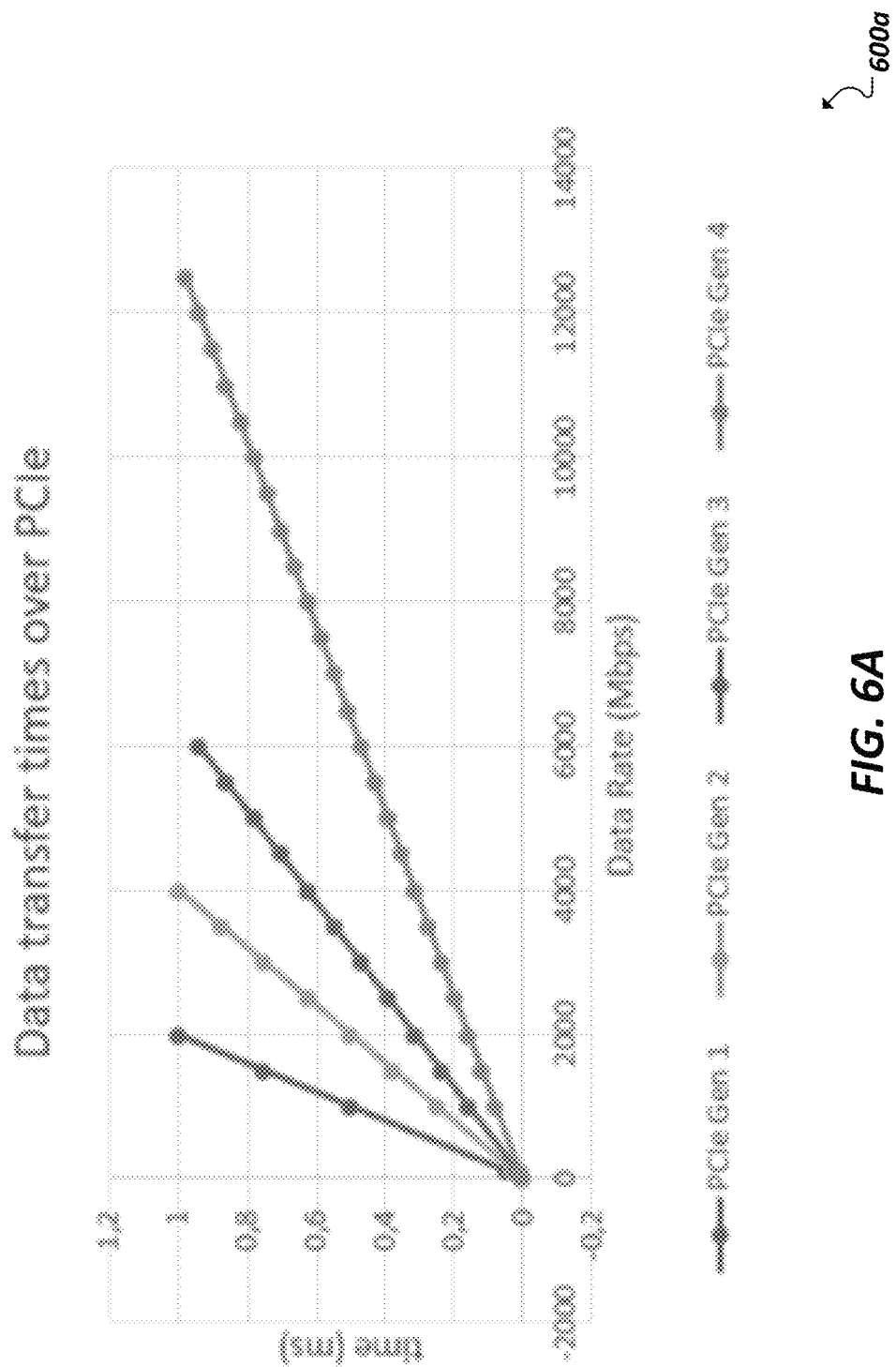
FIGS. 6A-6B are charts showing example performance characteristics of an example link coupling an example communication module with an example host processor of a device.

Turning to FIG. 6A, a graph 600a is shown illustrating the transfer time, or the time the data needs for transmission of an amount of data, on a link when using various link speeds. In the particular example illustrated in FIG. 6A, curves 605, 610, 615, 620 are shown of transfer times (i.e., time in milliseconds) for a particular amount of data at various PCIe generation link speeds (e.g., PCIe Gen 1, PCIe Gen 2, PCIe Gen3, PCIe Gen 4) plotted against the over air data rate (i.e., the rate of data as it is received from a wireless network). As should be appreciated by the diagram 600a of FIG. 6A, at higher data rates, higher link speeds may be needed to transfer all of the data aggregated within an aggregation period. For instance, if the available active transmission window is 1 ms, lower link speeds may actually be incapable of fully transferring the aggregated data when the data is arriving at particular data rates. Accordingly, based on the transmission window and the detected wireless data rate, an example speed change block may detect that one or more of the lower supported link speeds may be inadequate in achieved a target transfer time. This said, in the interest of saving power on the link, the speed change block may bias its speed change decisions so as to select the slowest link speed that is predicted to still be capable of handling the incoming data.

For instance, in an implementation of a PCIe link coupling an application processor to a modem, an aggregation period may be implemented for the link, such that, for power consumption reasons, the PCIe link is set into a low power idles state (e.g. L1.2) in times where no data is to be transferred, and set back to L0 when data is to be transferred. However, transitioning between the low power idle and higher power active states is not cost-free, as switching from L1.2 to L0 may take several 10 s of microseconds in some implementations. This transition is referred to herein as a link activation time. Further, links operating at a higher link speed generally consume more power in the L0 state than when at L0 in a lower link speed. In a PCIe example, operating at PCIe Gen 4 speeds consumes significantly more power than at PCIe Gen 1 speeds. Accordingly, due to the costs from active transmission time and L0 activation time, for lower data rates it is more power efficient to operate in the lowest supported link speed (e.g., PCIe Gen 1) than at a higher link speed (e.g., PCIe Gen 4), even when it takes more time to transmit the data.

Figure 6B:
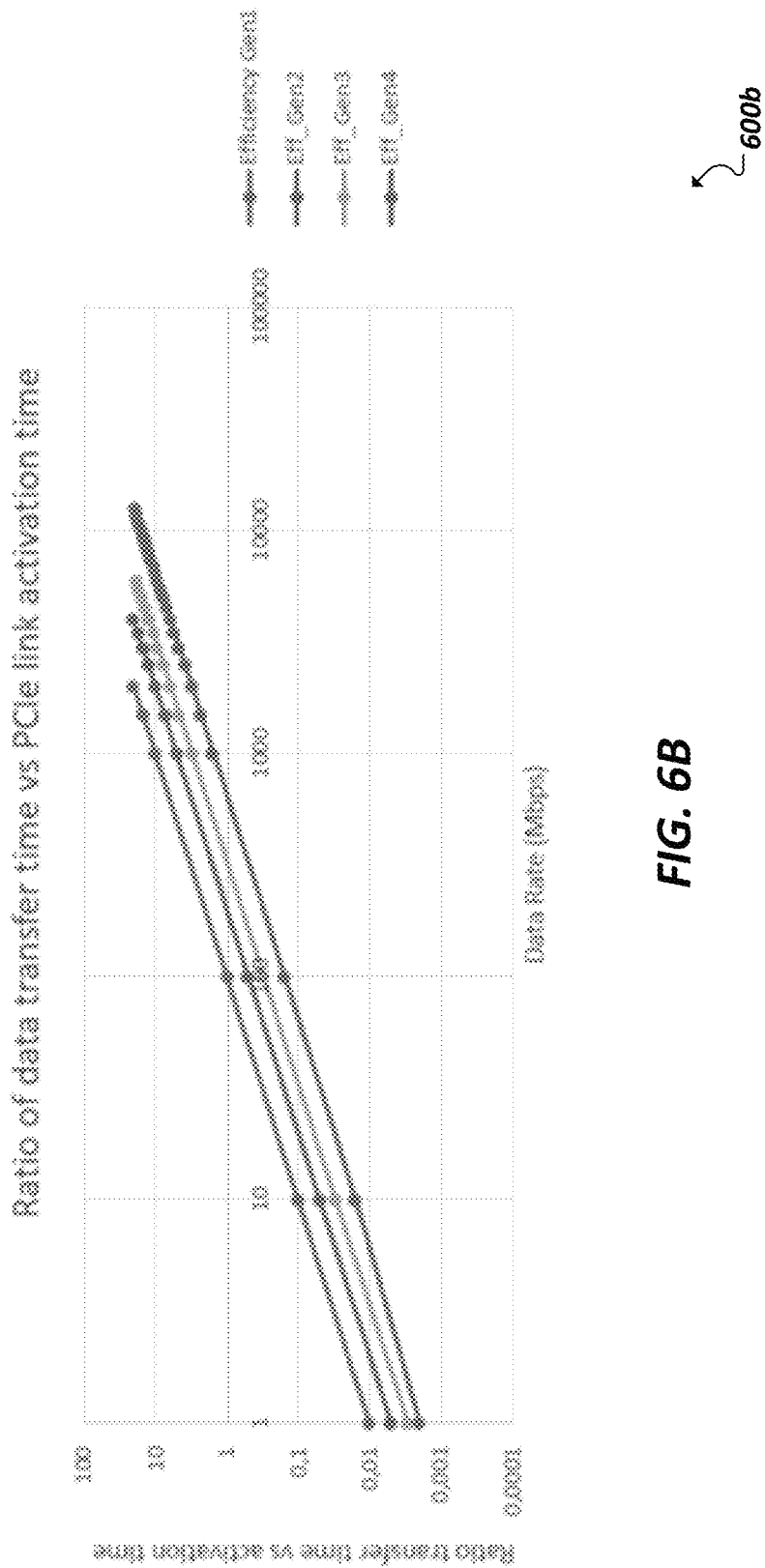

FIG. 6B is another graph 600b illustrating the ratio between data transfer times and L0 activation times at varying wireless data rates when the link speed is set to various PCIe GenX link speeds. In this example, a ratio of 1 means that the length of the data transfer time is equal to the length of the L0 activation time. A ratio of 0.1, on the other hand, means that the data transfer time is $1/10^{th}$ the L0 activation time, and so on. While the length of the aggregation period may contribute to the ratio illustrated in FIG. 6B, lengthening the aggregation period (i.e., buffering data prior to transferring it during the next L0 active state) adds user data latency, which may also be undesirable. Accordingly, an aggregation period may be fixed so as to optimize the balance between power savings and data latency. In light of the configured aggregation period, a speed change block may implement an algorithm to select the lowest possible supported link speed, which is, ideally, just good enough for transferring data accumulating within the aggregation window at the actual wireless data rate, rather than always transferring the data at higher link speeds tuned for the highest possible data rates utilized in wireless communication on the device. Indeed, on this basis, the speed change block may utilize historical parameter data and predictive parameter data to predict the data rate that will be applied to incoming data and may utilize this prediction to further determine, which of the supported (and in some cases, such as PCIe, quantized) link speeds should be applied for the transfer of this data from the modem to the application processor over a link.

Figure 7:
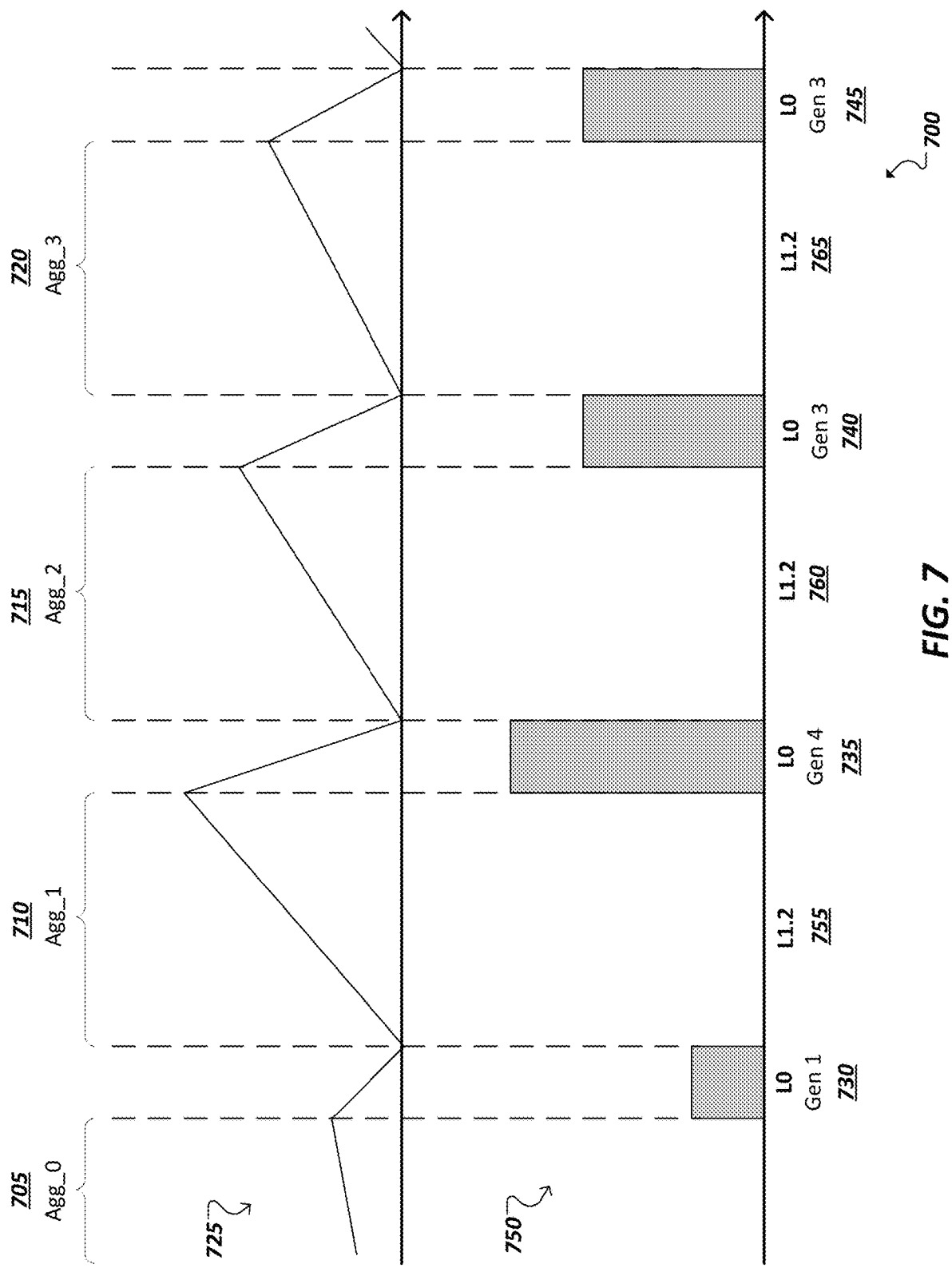
FIG. 7 is a diagram illustrating example link speed changes on an example link coupling a communication module to a host processor.

Turning to FIG. 7, a diagram 700 is shown illustrating a simplified example of the aggregation and transfer of data on a link connecting a modem with a host processor (e.g., an application processor) of an example mobile computing system. As represented in FIG. 7, the accumulation of data in respective aggregation periods (e.g., 705, 710, 715, 720) within a buffer of an example model is represented by the plot 725. As is illustrated, the aggregation periods are interrupted by transmission, or transfer, windows (e.g., corresponding to 730, 735, 740, 745) in which aggregated data is to be sent from the modem to the host processor on the link. Accordingly, as represented by the plot 725, the amount of aggregated data stored in the modem's local memory rises during the aggregation periods and then is rapidly reduced during the link data transfers (e.g., 730, 735, 740, 745). The diagram 700 includes the representation of these transfers of data on the link over time (at 750). For instance, the blocks 730, 735, 740, 745 represent respective amounts of data sent on the link while the link is in an active L0 state.

As further shown in FIG. 7, the modem (or the host processor) may be configured to predict an appropriate one of a set of available link speeds to use to transfer data collected during the aggregation periods, resulting in the link speed potentially changing (e.g., through protocol logic at the direction of a speed change block) from one link data transfer to the next. As noted above, some implementations of a modem or other communication device, may be equipped with a speed change block to determine whether to change the link speed applied at the link between data transfers in an aggregation period (e.g., 705, 710, 715, 720). Determining whether to change the link speed may be based on assessment of a combination of historical information (e.g., how much data had to be transferred over the PCIe link in the last X milliseconds) and a prediction of how much data is assumed to be transferred in the near future over the next Y milliseconds. As noted above, the determination of whether to change the link speed may also be based on the length of the aggregation window (e.g., some implementations may permit the aggregation window to change from session to session or even from aggregation period to aggregation period, affecting the determination of the appropriate link speed). The amount of upcoming data may be based on a predicted data rate that will be used during receiving of the data over the wireless air interface of the mobile computing device. In some instances, this predicted future data rate may be based on information derived at the air interface between the cellular modem and the base station by the modem. Such information may be embodied in predictive parameter data and include parameters such as the current radio access technology detected as being used or available (e.g., being active in 3G, 4G or 5G), how many component carries and which frequency bandwidth is used for the data transfer, among other parameters.

For instance, in the simplified example of FIG. 7, at 730, data aggregated (at least in part) during aggregation period 705 may be transferred when the link is brought to an active L0 state at a PCIe Gen 1 link speed. This may be desirable, as it allows the lowest power link speed to be used, when possible, to effectively transfer the aggregated data on the link. However, the same mobile computing device may be equipped to support high speed wireless data rates or applications, which, during certain aggregation periods, are more data hungry than others. Accordingly, in some implementations, much larger amount of data may be obtained over a wireless network by the modem in other aggregation periods (e.g., 710). Such instances may be predicted according to an algorithm implemented utilizing computing logic of a speed change block, and the speed change block may cause the link speed to be adjusted in a corresponding, subsequent link data transfer (e.g., 735). In the particular example of FIG. 7, a higher data rate is detected within corresponding to aggregation period 710 and the speed change block may signal interconnect protocol logic of the modem to negotiate the reactivation of the link to bring the link up to L0 at the faster (and more power hungry) PCIe Gen 4 link speed (at 735). Similarly analyses of the aggregation periods and link speed determinations may be made as the modem operates and more data is to be sent in subsequent link data transfers (e.g., 740, 745), with the characteristics of the incoming data and historical performance of the link being considered in determining what link speed to apply at the link. In this manner, power usage by the link may be optimized, with staggered inactive aggregation periods (where the link is brought down to a low power L1 (e.g., L1.2) state (at 755, 760, 765, etc.)) and data rate-adaptive link speeds being used to effectively transfer the data received over a wireless network from the modem to the host processor.

As noted above, it should be appreciated that the illustrated example of FIG. 7 is a simplified example. For instance, while the accumulation of data during aggregation periods (e.g., 705, 710, 715, 720) is illustrated in a simplified manner suggesting a uniform rate of data accumulation within the modem memory, in reality, the accumulation of data may be non-linear, as different data rates, non-linear bursts of data, and varying wireless technologies (e.g., 3G and 4G) may be realized and utilized within a single aggregation period. Further, the example of FIG. 7 does not explicitly show the time used to transition the link between L0 and L1 states, which, in some instances, may require non-uniform amounts of time. Such state transitions may result in non-uniform times between data transfers. Such potential variations in state transition and link speed transition times may also be considered when determining a desired link speed and when to initiate a transition from one link speed to another. The simplified representation of FIG. 7 also shows link data transfers (e.g., 730, 735, 740, 745) each successfully clearing the aggregated data collected during preceding aggregation periods (e.g., 705, 710, 715, 720, etc.). In some implementations, the modem may be configured to hold the link in an L0 state until all of an amount of aggregated data is transferred. In other cases, a maximum link transfer period may be defined, in which the link is brought to the L0 active state at a particular one of the supported link speeds for a set duration. In some cases, all of the data collected in the buffer during one or more aggregation periods may be transferred before the defined transfer period expires. In other instances, the period may expire and the link may be brought back down to an idle low power state before all of the aggregated data is transferred (e.g., evidencing that an insufficiently fast link speed was selected for the transfer), which may result in some of the aggregating carrying over to a next data transfer period and additional data being added to this "leftover" data in the next aggregation period. Further, in some cases, data may continue to be aggregated within a modem's buffer during a data transfer on the link and this data may be effectively sent on the link as it is demodulated and readied by the modem for consumption by the host processor, among other example implementations. Based on how the transitions between aggregation period and link data transfer are configured (e.g., with fixed durations, requirements for completely transferring data, etc.), the speed change block may consider such a configuration as factors in the algorithm employed to determine the link speed to be employed during a given a link data transfer, among other example inputs and factors.

As noted above, in some cases, an aggregation period scheme may define a time budget for the aggregation periods' or link data transfers' duration. Accordingly, protocol logic and/or a speed change block of a modem (and/or partner host processor) may adjust the link state switching points in time and duration to fit the traffic transmission time scheme configured for the link (e.g., by system software of the mobile computing device). As an example, the link may be configured to transfer data every millisecond. Accordingly, the aggregation period switching time is configured such that the switching duration fits into the time budget determined by the data aggregation period. In some cases, once all the collected data is transferred, the link may be almost immediately transitioned to the inactive state. In some cases, the speed change algorithm may select the lowest available link speed capable of transferring all of the data within a given window (rather than using a higher link speed for a shorter duration), among other considerations. In cases where the speed change algorithm selects and applies a link speed that is unable to transfer all of the aggregated data within the next data transfer time interval, excess data may spill over into the next data transfer interval, adding latency to this remaining portion of data (e.g., which may be acceptable in some implementations, assuming such cases are outliers), among other examples and implementations.

Figure 8:
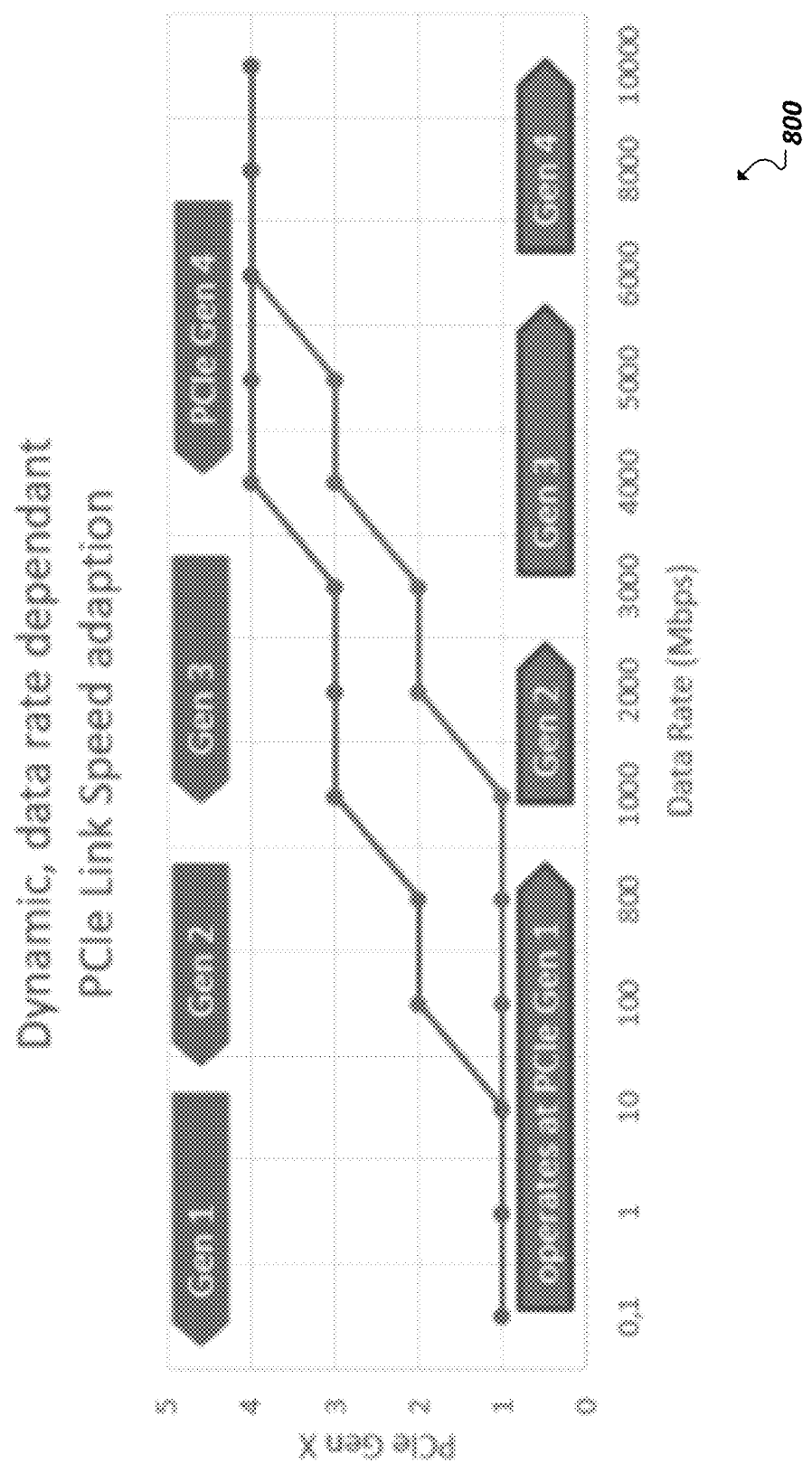
FIG. 8 is a diagram representing an example implementation of a link speed change algorithm implemented on an example computing device.

In some implementations, a speed change block may predict the wireless data rate corresponding to data being aggregated within a given window. This predicted data rate may be utilized then to determine the link speed to be applied on the link to transfer this data from the modem to the host processor. For instance, threshold data rate values may be defined and associated with supported link speeds of the device. Accordingly, in such examples, determining that a predicted data rate falls at, above, or below a defined threshold may cause an example speed change block to determine that a particular one of the supported link speeds is to be applied to an upcoming link data transfer based on the predicted data rate. In some implementations, to avoid toggling between the supported link speeds too frequently, the speed change algorithm implemented using the speed change block may apply a hysteresis, such as represented in the example illustrated by diagram 800 in FIG. 8. Generally, the hysteresis applied in the speed change algorithm may set thresholds or guidelines that cause speed changes from lower link speeds to higher link speed to occur at predicted data rates that are higher than predicted data rates causing speed change downgrades from higher link speeds to lower link speeds. For instance, the example of FIG. 8 illustrates an example speed change algorithm used to determine speed changes between a set of supported PCIe Gen X link speeds (e.g., PCIe Gen 1, PCIe Gen 2, PCIe Gen 3, PCIe Gen 4, etc.). In this particular example, a speed change from PCIe Gen 1 link speed to PCIe Gen 2 link speed may be determined based on determining a predicted data rate in excess of 1000 Mbps, while speed changes from PCIe Gen 2 link speed to PCIe Gen 1 link speed are determined based on a predicted data rate below 100 Mbps. Further, in this example, a speed change from PCIe Gen 2 link speed to PCIe Gen 3 link speed correspond to exceeding a threshold data rate of 3000 Mbps, while downgrading from PCIe Gen 3 link speed to PCIe Gen 2 link speed is triggered when a predicted data rate falling below a threshold data rate of 1000 Mbps, and so on as illustrated. Other example implementations may employ the same or different and/or additional factors, thresholds, inputs, and algorithmic constructions in order to dynamically select and change link speeds so as to select adequate link speeds for sending aggregated data at the lowest power consumption.

Figure 9:
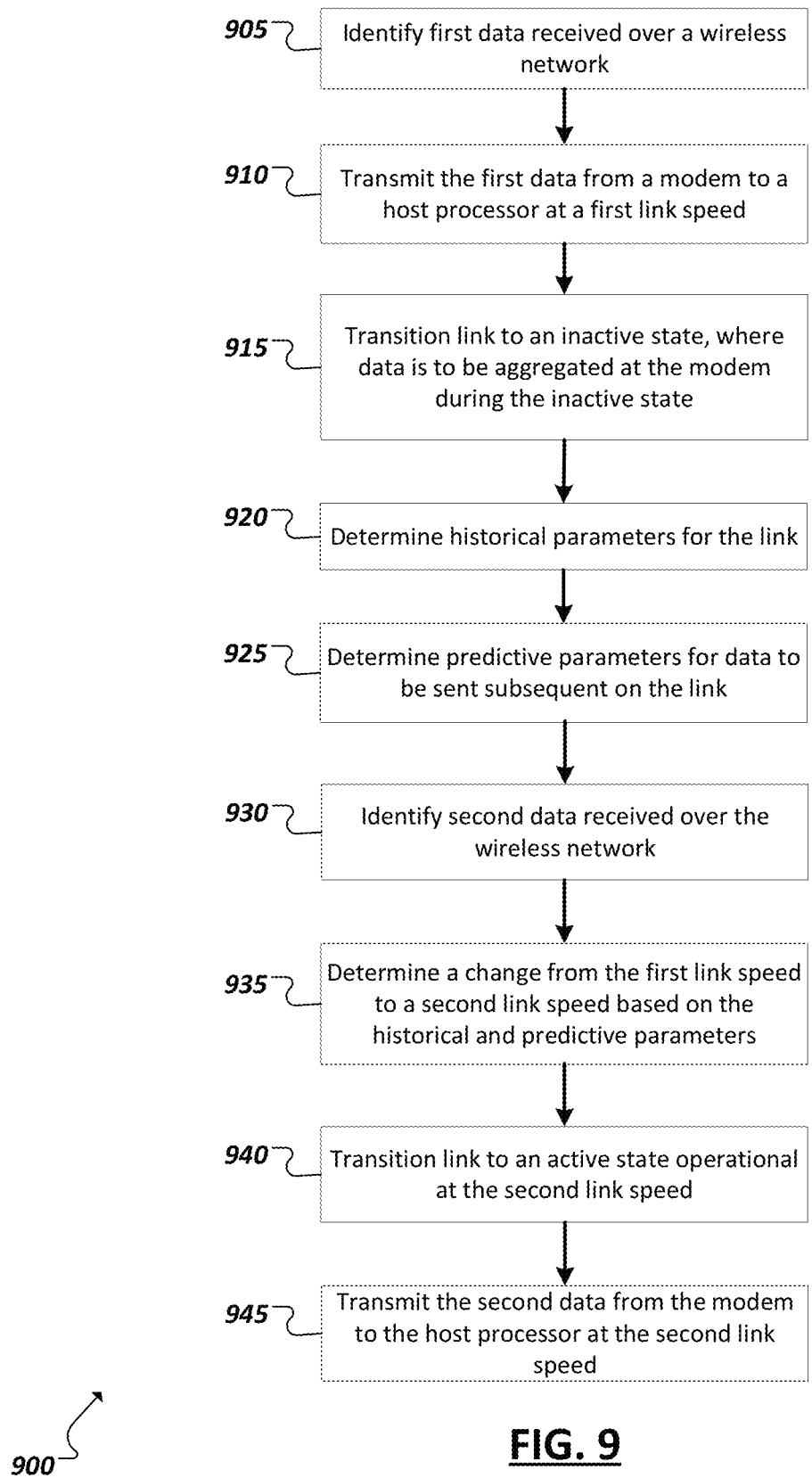
FIG. 9 is a flow diagram representing an example technique for adapting link speed of an example link coupling a communication module to a host processor.

FIG. 9 is a flowchart 900 illustrating an example technique for adapting link speed of a link connecting a communication module, such as a modem, to a host processor in a mobile computing device. For instance, first data may be identified 905 that has been received at the device and aggregated at the modem during an aggregation period configured for the link. The first data may be transmitted 910 over the link from the modem to the host processor at a first link speed. The link may then be transitioned to an idle low power state to implement another aggregation period for power savings at the link. Historical parameters of the link may be determined 920 and predictive parameters associated with future data to be transmitted over the link may be determined 925. This future data may include second data, which may also be identified 930 as received by the device from the wireless network (e.g., during the subsequent aggregation period). A change in the link speed of the link may be determined 935 based on the historical and predictive parameters so that the link speed applied to send the second data is adequate to send the amount of the second data while limiting the power utilized to send the second data. The link may then be brought out of the aggregation period by transitioning 940 (and performing related speed negotiation and training) the link to an active transmitting state at the second speed. The second data may then be transmitted 945 on the link from the modem to the host processor at the second speed.

The foregoing disclosure has presented a number of examples. While some specific examples have been described, it should be appreciated that other alternative embodiments may apply the features and functionality described herein within other systems that utilize different technologies, components, and protocols than those specifically named herein. For instance, while some of the examples described and illustrated herein reference state machines and link speeds of PCIe or PCIe-based protocols, it should be appreciated that similar, corresponding enhancements may be made to systems and links utilizing other interconnect protocols, such OpenCAPI™, Gen-Z™, UPI, Universal Serial Bus, (USB), Cache Coherent Interconnect for Accelerators (CCIX™) Advanced Micro Device™'s (AMD™) Infinity™, Common Communication Interface (CCI), or Qualcomm™'s Centrig™ interconnect, among others.

Note that the apparatus, methods, and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures. For instance, a mobile computing device implementing adapting link speed control, as discussed herein, may include such devices as laptops, desktops, smartphones, Internet of Things (IoT) device, wearables, smart appliance, gaming consoles, media consoles, etc. In another example, a the modem enhancements discussed herein may be applied to modems in non-mobile architectures, such as a server computing system (e.g., a rack server, blade server, tower server, rack scale server architecture or other disaggregated server architecture), among other examples.

Figure 10:
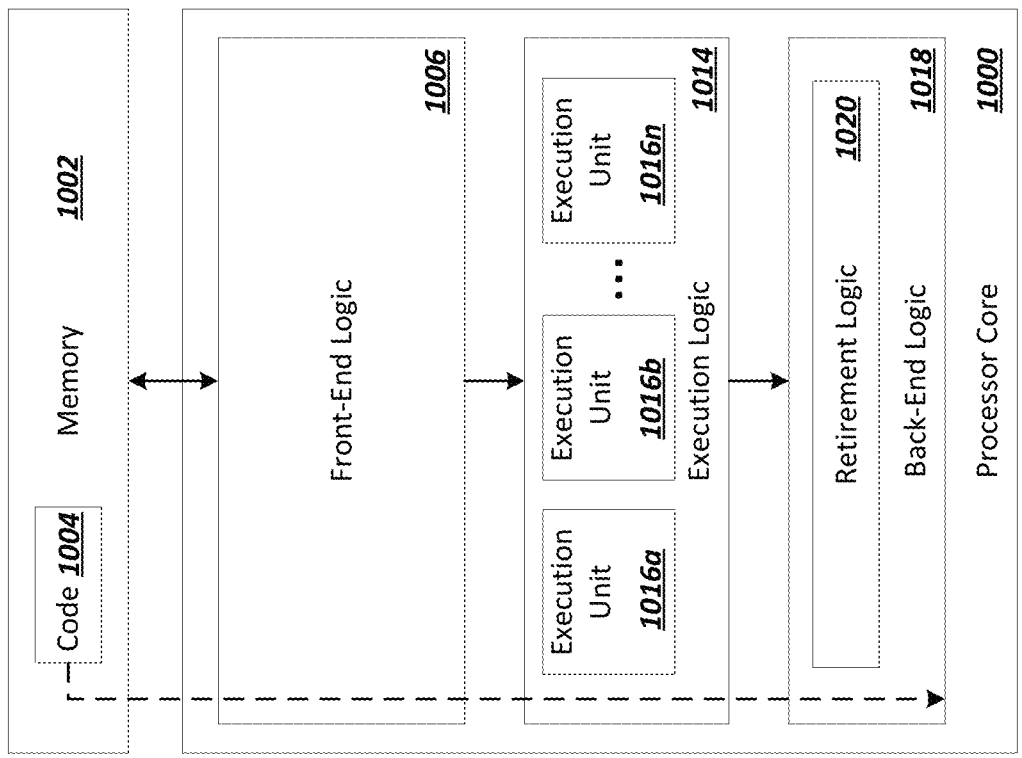
FIG. 10 is a block is a block diagram of an exemplary processor in accordance with one embodiment.

FIG. 10 is an example illustration of a processor according to an embodiment. Processor 1000 is an example of a type of hardware device that can be used in connection with the implementations above. Processor 1000 may be any type of processor, such as a microprocessor, an embedded processor, a digital signal processor (DSP), a network processor, a multi-core processor, a single core processor, or other device to execute code. Although only one processor 1000 is illustrated in FIG. 10, a processing element may alternatively include more than one of processor 1000 illustrated in FIG. 10. Processor 1000 may be a single-threaded core or, for at least one embodiment, the processor 1000 may be multi-threaded in that it may include more than one hardware thread context (or "logical processor") per core.

FIG. 10 also illustrates a memory 1002 coupled to processor 1000 in accordance with an embodiment. Memory 1002 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 1000 can execute any type of instructions associated with algorithms, processes, or operations detailed herein. Generally, processor 1000 can transform an element or an article (e.g., data) from one state or thing to another state or thing.

Code 1004, which may be one or more instructions to be executed by processor 1000, may be stored in memory 1002, or may be stored in software, hardware, firmware, or any suitable combination thereof, or in any other internal or external component, device, element, or object where appropriate and based on particular needs. In one example, processor 1000 can follow a program sequence of instructions indicated by code 1004. Each instruction enters a front-end logic 1006 and is processed by one or more decoders 1008. The decoder may generate, as its output, a micro operation such as a fixed width micro operation in a predefined format, or may generate other instructions, microinstructions, or control signals that reflect the original code instruction. Front-end logic 1006 also includes register renaming logic 1010 and scheduling logic 1012, which generally allocate resources and queue the operation corresponding to the instruction for execution.

Processor 1000 can also include execution logic 1014 having a set of execution units 1016a, 1016b, 1016n, etc. Some embodiments may include a number of execution units dedicated to specific functions or sets of functions. Other embodiments may include only one execution unit or one execution unit that can perform a particular function. Execution logic 1014 performs the operations specified by code instructions.

After completion of execution of the operations specified by the code instructions, back-end logic 1018 can retire the instructions of code 1004. In one embodiment, processor 1000 allows out of order execution but requires in order retirement of instructions. Retirement logic 1020 may take a variety of known forms (e.g., re-order buffers or the like). In this manner, processor 1000 is transformed during execution of code 1004, at least in terms of the output generated by the decoder, hardware registers and tables utilized by register renaming logic 1010, and any registers (not shown) modified by execution logic 1014.

Although not shown in FIG. 10, a processing element may include other elements on a chip with processor 1000. For example, a processing element may include memory control logic along with processor 1000. The processing element may include I/O control logic and/or may include I/O control logic integrated with memory control logic. The processing element may also include one or more caches. In some embodiments, non-volatile memory (such as flash memory or fuses) may also be included on the chip with processor 1000.

Figure 11:
FIG. 11 is a block diagram of an exemplary mobile device system in accordance with one embodiment.

Referring now to FIG. 11, a block diagram is illustrated of an example mobile device 1100. Mobile device 1100 is an example of a possible computing system (e.g., a host or endpoint device) of the examples and implementations described herein. In an embodiment, mobile device 1100 operates as a transmitter and a receiver of wireless communications signals. Specifically, in one example, mobile device 1100 may be capable of both transmitting and receiving cellular network voice and data mobile services. Mobile services include such functionality as full Internet access, downloadable and streaming video content, as well as voice telephone communications.

Mobile device 1100 may correspond to a conventional wireless or cellular portable telephone, such as a handset that is capable of receiving "3G", or "third generation" cellular services. In another example, mobile device 1100 may be capable of transmitting and receiving "4G" mobile services as well, or any other mobile service.

Examples of devices that can correspond to mobile device 1100 include cellular telephone handsets and smartphones, such as those capable of Internet access, email, and instant messaging communications, and portable video receiving and display devices, along with the capability of supporting telephone services. It is contemplated that those skilled in the art having reference to this specification will readily comprehend the nature of modern smartphones and telephone handset devices and systems suitable for implementation of the different aspects of this disclosure as described herein. As such, the architecture of mobile device 1100 illustrated in FIG. 11 is presented at a relatively high level. Nevertheless, it is contemplated that modifications and alternatives to this architecture may be made and will be apparent to the reader, such modifications and alternatives contemplated to be within the scope of this description.

In an aspect of this disclosure, mobile device 1100 includes a transceiver 1102, which is connected to and in communication with an antenna. Transceiver 1102 may be a radio frequency transceiver. Also, wireless signals may be transmitted and received via transceiver 1102. Transceiver 1102 may be constructed, for example, to include analog and digital radio frequency (RF) 'front end' functionality, circuitry for converting RF signals to a baseband frequency, via an intermediate frequency (IF) if desired, analog and digital filtering, and other conventional circuitry useful for carrying out wireless communications over modern cellular frequencies, for example, those suited for 3G or 4G communications. Transceiver 1102 is connected to a processor 1104, which may perform the bulk of the digital signal processing of signals to be communicated and signals received, at the baseband frequency. Processor 1104 can provide a graphics interface to a display element 1108, for the display of text, graphics, and video to a user, as well as an input element 1110 for accepting inputs from users, such as a touchpad, keypad, roller mouse, and other examples. Processor 1104 may include an embodiment such as shown and described with reference to processor 1000 of FIG. 10.

In an aspect of this disclosure, processor 1104 may be a processor that can execute any type of instructions to achieve the functionality and operations as detailed herein. Processor 1104 may also be coupled to a memory element 1106 for storing information and data used in operations performed using the processor 1104. Additional details of an example processor 1104 and memory element 1106 are subsequently described herein. In an example embodiment, mobile device 1100 may be designed with a system-on-a-chip (SoC) architecture, which integrates many or all components of the mobile device into a single chip, in at least some embodiments.

Figure 12:
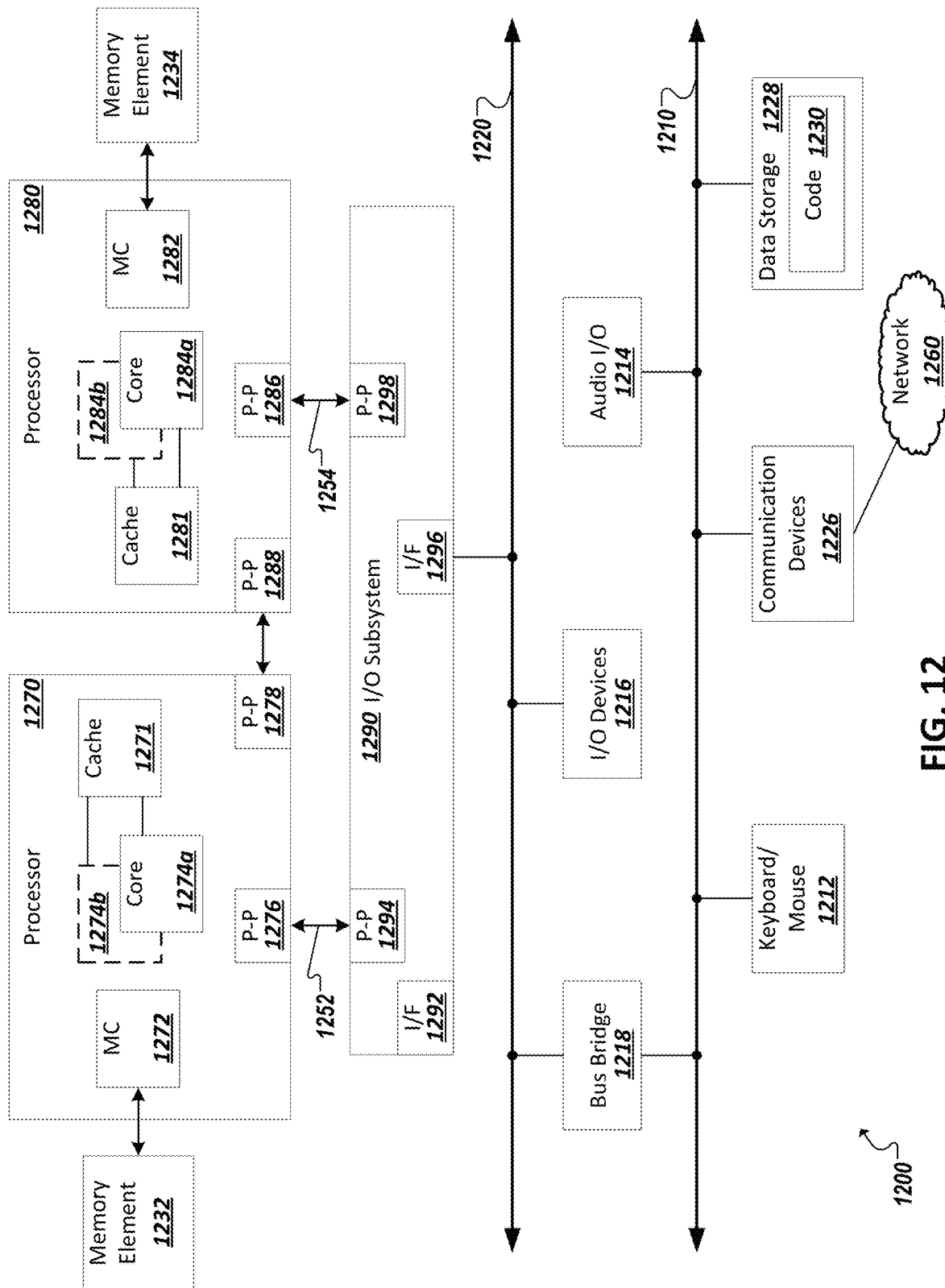
FIG. 12 is a block diagram of an exemplary computing system in accordance with one embodiment.

FIG. 12 illustrates a computing system 1200, such as a mobile computing system, that is arranged in a point-to-point (PtP) configuration according to an embodiment. In particular, FIG. 12 shows a system where processors, memory, and input/output devices are interconnected by a number of point-to-point interfaces. Generally, one or more of the computing systems described herein may be configured in the same or similar manner as computing system 1200.

Processors 1270 and 1280 may also each include integrated memory controller logic (MC) 1272 and 1282 to communicate with memory elements 1232 and 1234. In alternative embodiments, memory controller logic 1272 and 1282 may be discrete logic separate from processors 1270 and 1280. Memory elements 1232 and/or 1234 may store various data to be used by processors 1270 and 1280 in achieving operations and functionality outlined herein.

Processors 1270 and 1280 may be any type of processor, such as those discussed in connection with other figures. Processors 1270 and 1280 may exchange data via a point-to-point (PtP) interface 1250 using point-to-point interface circuits 1278 and 1288, respectively. Processors 1270 and 1280 may each exchange data with a chipset 1290 via individual point-to-point interfaces 1252 and 1254 using point-to-point interface circuits 1276, 1286, 1294, and 1298. Chipset 1290 may also exchange data with a high-performance graphics circuit 1238 via a high-performance graphics interface 1239, using an interface circuit 1292, which could be a PtP interface circuit. In alternative embodiments, any or all of the PtP links illustrated in FIG. 12 could be implemented as a multi-drop bus rather than a PtP link.

Chipset 1290 may be in communication with a bus 1220 via an interface circuit 1296. Bus 1220 may have one or more devices that communicate over it, such as a bus bridge 1218 and I/O devices 1216. Via a bus 1210, bus bridge 1218 may be in communication with other devices such as a user interface 1212 (such as a keyboard, mouse, touchscreen, or other input devices), communication devices 1226 (such as modems, network interface devices, or other types of communication devices that may communicate through a computer network 1260), audio I/O devices 1214, and/or a data storage device 1228. Data storage device 1228 may store code 1230, which may be executed by processors 1270 and/or 1280. In alternative embodiments, any portions of the bus architectures could be implemented with one or more PtP links.

The computer system depicted in FIG. 12 is a schematic illustration of an embodiment of a computing system that may be utilized to implement various embodiments discussed herein. It will be appreciated that various components of the system depicted in FIG. 12 may be combined in a system-on-a-chip (SoC) architecture or in any other suitable configuration capable of achieving the functionality and features of examples and implementations provided herein.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

In some embodiments, an electronic device may be configured to perform one or more processes, techniques, and/or methods as described herein, or portions thereof. One such process is depicted in Figure X-2. For example, the process may include performing, by a first and second retimer, an SKP adjustment during a first SKP ordered set (OS); and performing, by a third and fourth retimer, an SKP adjustment during a second SKP OS.

In some embodiments, an electronic device may be configured to perform one or more processes, techniques, and/or methods as described herein, or portions thereof. For example, the process may include enhancing a training ordered set (OS) to allow for five generations of speeds; and setting a configuration register to indicate a Gen 5 PCIe speed.

In some embodiments, an electronic device may be configured to perform one or more processes, techniques, and/or methods as described herein, or portions thereof. For example, the process may include identifying a channel type provided by a platform; identifying a presence of one or more retimers; and choosing, based on the channel type and whether one or more retimers are present, between 25 Gigatransfers per second (GT/s) and 32 GT/s.

In some embodiments, an electronic device may be configured to perform one or more processes, techniques, and/or methods as described herein, or portions thereof. For example, the process may include identifying a channel link width from a set that includes widths of x20, x24, x28, and x28; and communicating over a channel link based on the identified channel link width.

In some embodiments, an electronic device may be configured to perform one or more processes, techniques, and/or methods as described herein, or portions thereof. For example, the process may include identifying recovered clock data from clock data recovery (CDR); and transmitting, based on the recovered clock data, transmit (TX) data after an initial training.

In some embodiments, a method of communicating in accordance with a PCIe standard may be provided that includes performing, by a first and second retimer, an SKP adjustment during a first SKP ordered set (OS), and performing, by a third and fourth retimer, an SKP adjustment during a second SKP OS. The method can further include reducing a SKP OS frequency by half. In some cases, the first SKP OS may be sent back-to-back with the second SKP OS. The method may further include enhancing a training ordered set (OS) to allow for five generations of speeds, and setting a configuration register to indicate a Gen 5 PCIe speed. Further, a channel type provided by a platform may be identified, the presence of one or more retimers may be identified, and the channel speed may be selected (e.g., from either 25 Gigatransfers per second (GT/s) or 32 GT/s) based on the channel type and whether one or more retimers are present. This selection may also be determined based on whether forward error correction (FEC) is enabled or supported. This speed selection may take place during link training. These example methods may additional include identifying a channel link width from a set that includes widths of x20, x24, x28, and x28, and communicating over a channel link based on the identified channel link width. Further, recovered clock data from a clock data recovery component may be identified, and transmit data may be sent based on the recovered clock data following training of the link.

In some embodiments, an apparatus may be provided to communicate in accordance with a PCIe-based standard, the apparatus including an extended continuous time linear equalizer (CTLE), and/or minimum 8-tap decision feedback equalizer (DFE), and/or a T-coil or Pi-coil termination, and/or a data pattern filter related to clock data recovery (CDR), and/or a 4-way interleaved clock architecture, among other example features and components.

In some embodiments, an apparatus may be provided to communicate in accordance with a peripheral component interconnect express (PCIe) standard with channel loss characteristics, such as discussed above. The PCIe standard may be a Gen 5 (or higher) PCIe standard.

The following examples pertain to embodiments in accordance with this Specification. Example 1 is an apparatus including: a modem, where the modem is to connect to a host data processor over a serial, point-to-point data link, and the modem includes: a speed change manager to determine, based on the first and second parameters, a change from a first one of a plurality of defined link speeds used in a transmission of first data over the data link to a second one of the plurality of link speeds for transmission of second data over the data link, where the change is to be determined based on first parameters associated with one or more previous data transmissions from the modem to the host data processor over the data link and second parameters associated with subsequent data to be sent over the data link. The modem further includes an interconnect protocol stack to: transition the data link from an active transmission state to a low power inactive state after the transmission of the first data; and transition the data link from the low power inactive state to the active transmission state to send the second data over the data link at the second link speed, where the second parameters include parameters associated with the second data.

Example 2 includes the subject matter of Example 1, further including a mobile phone, and the mobile phone includes the modem.

Example 3 includes the subject matter of any one of Examples 1-2, where the first and second data include demodulated data from a cellular data network.

Example 4 includes the subject matter of any one of Examples 1-3, where the data link is compliant with a Peripheral Component Interconnection Express (PCIe)-based protocol.

Example 5 includes the subject matter of Example 4, where the active transmission state includes an L0 state and the low-power inactive state includes a PCIe L1.2 state.

Example 6 includes the subject matter of any one of Examples 4-5, where each link speed in the plurality of link speeds corresponds to a respective one of a plurality of generations of the PCIe-based protocol.

Example 7 includes the subject matter of any one of Examples 4-6, where the data link includes a single transmit lane and a single receive lane.

Example 8 includes the subject matter of any one of Examples 1-7, where the first parameters include link speeds utilized in the one or more previous data transmissions and amounts of data transmitted in the previous data transmissions.

Example 9 includes the subject matter of any one of Examples 1-8, where determination of the change from the first link speed to the second link speed includes prediction of a particular data rate for transmission of the second data to the host processor, and the change is determined based on the data rate falling within a particular range of data rate values associated with the second link speed.

Example 10 includes the subject matter of Example 9, where the second link speed is higher than the first link speed, a change from the first link speed to the second link speed is associated with the particular range of data rate values, the particular range of data rate values is bounded by a first value and a second value, a change from the second link speed to the first link speed is associated with another range of data rate values, and the other range of data rate values overlaps with the particular range of data rate values in that one or more of the data rates in the other range of data rate values fall between the first and second values.

Example 11 includes the subject matter of any one of Examples 1-10, where the second parameters include one or more of radio access technology used to receive the second data over a wireless network, bandwidth available for receipt of the second data over the wireless network, and a transfer time for the transmission of the second data to the host processor.

Example 12 includes the subject matter of any one of Examples 1-11, further including one or more monitors to: detect the first parameters; and detect the second parameters.

Example 13 includes the subject matter of any one of Examples 1-12, where the speed change manager is implemented at least in part in hardware of the modem.

Example 14 includes the subject matter of any one of Examples 1-13, where Example # includes the subject matter includes one of a laptop, smartphone, tablet, or wearable computing device.

Example 15 is a non-transitory machine-readable storage medium with instructions stored thereon, the instructions executable to cause a machine to: identify first data received over a cellular wireless network at a device; transmit the first data from a modem of the device to a processor of the device over a point-to-point serial data link at a first one of a plurality of link speeds; transition the data link to an inactive state; determine historical parameters of transmission of data from the modem to the processor over the data link; determine predictive parameters associated with second data to be received after the first data; identify the second data received over the cellular wireless network at the device, where at least a portion of the second data is received at the device while the data link is in the inactive state; and determine a change from the first link speed to a second one of the plurality of link speeds based on the historical parameters and the predictive parameters; and transition the data link to an active state operational at the second link speed to transmit the second data from the modem to the processor over the data link.

Example 16 includes the subject matter of Example 15, where the plurality of link speeds include a Peripheral Component Interconnection Express (PCIe) Generation 1 link speed, a PCIe Generation 2 link speed, a PCIe Generation 3 link speed, and a PCIe Generation 4 link speed.

Example 17 includes the subject matter of any one of Examples 15-16, where the change is determined based on a hysteresis model.

Example 18 includes the subject matter of any one of Examples 15-17, where the device includes a mobile device.

Example 19 includes the subject matter of Example 18, where the mobile device includes one of a laptop, smartphone, tablet, or wearable computing device.

Example 20 includes the subject matter of any one of Examples 15-19, where the first and second data include demodulated data from a cellular data network.

Example 21 includes the subject matter of any one of Examples 15-20, where the data link is compliant with a Peripheral Component Interconnection Express (PCIe)-based protocol.

Example 22 includes the subject matter of Example 21, where the active transmission state includes an L0 state and the low-power inactive state includes a PCIe L1.2 state.

Example 23 includes the subject matter of any one of Examples 15-22, where the data link includes a single transmit lane and a single receive lane.

Example 24 includes the subject matter of any one of Examples 15-23, where the historical parameters include link speeds utilized in the one or more previous data transmissions and amounts of data transmitted in the previous data transmissions.

Example 25 includes the subject matter of any one of Examples 15-24, where determination of the change from the first link speed to the second link speed includes prediction of a particular data rate for transmission of the second data to the host processor, and the change is determined based on the data rate falling within a particular range of data rate values associated with the second link speed.

Example 26 includes the subject matter of Example 26, where the second link speed is higher than the first link speed, a change from the first link speed to the second link speed is associated with the particular range of data rate values, the particular range of data rate values is bounded by a first value and a second value, a change from the second link speed to the first link speed is associated with another range of data rate values, and the other range of data rate values overlaps with the particular range of data rate values in that one or more of the data rates in the other range of data rate values fall between the first and second values.

Example 27 includes the subject matter of any one of Examples 15-26, where the predictive parameters include one or more of radio access technology used to receive the second data over a wireless network, bandwidth available for receipt of the second data over the wireless network, and a transfer time for the transmission of the second data to the host processor.

Example 28 includes the subject matter of any one of Examples 15-27, where the instructions, when executed, further cause the machine to: detect, at the modem, the historical parameters; and detect, at the modem, the predictive parameters.

Example 29 includes the subject matter of any one of Examples 15-28, where instances of the inactive state correspond to aggregation periods on the data link.

Example 30 is a system including: a mobile computing device including: an antenna to receive data over a wireless network; an application processor; and a modem. The modem is coupled to and is to communicate with the application processor over a serial, point-to-point data link, and the modem includes code, executable at the modem to: transmit first data from the wireless network to the application processor over the data link at a first one of a plurality of link speeds; transition the data link to an inactive state after transmission of the first data; determine historical parameters of data transmissions from the modem to the application processor over the data link; determine predictive parameters associated with data to be transmitted by the modem to the application processor after transmission of the first data; identify second data from the wireless network at the device, where at least a portion of the second data is received while the data link is in the inactive state; determine a change from the first link speed to a second one of the plurality of link speeds based on the historical parameters and the predictive parameters; and transition the data link to an active state, where the data link is reactivated to be operational at the second link speed for transmission of the second data; and transmit the second data from the modem to the processor over the data link at the second link speed.

Example 31 includes the subject matter of Example 30, where the application processor transmits feedback data to the modem and the change is further determined based on the feedback data.

Example 32 includes the subject matter of any one of Examples 30-31, where the modem demodulates the first and second data prior to sending to the application processor.

Example 33 includes the subject matter of any one of Examples 30-32, where the mobile computing device includes one of a laptop, smartphone, tablet, or wearable computing device.

Example 34 includes the subject matter of any one of Examples 30-33, where the plurality of link speeds include a Peripheral Component Interconnection Express (PCIe) Generation 1 link speed, a PCIe Generation 2 link speed, a PCIe Generation 3 link speed, and a PCIe Generation 4 link speed.

Example 35 includes the subject matter of any one of Examples 30-34, where the change is determined based on a hysteresis model.

Example 36 includes the subject matter of any one of Examples 30-35, where the device includes a mobile device.

Example 37 includes the subject matter of Example 36, where the mobile device includes one of a laptop, smartphone, tablet, or wearable computing device.

Example 38 includes the subject matter of any one of Examples 30-37, where the first and second data include demodulated data from a cellular data network.

Example 39 includes the subject matter of any one of Examples 30-38, where the data link is compliant with a Peripheral Component Interconnection Express (PCIe)-based protocol.

Example 40 includes the subject matter of Example 39, where the active transmission state includes an L0 state and the low-power inactive state includes a PCIe L1.2 state.

Example 41 includes the subject matter of any one of Examples 30-40, where the data link includes a single transmit lane and a single receive lane.

Example 42 includes the subject matter of any one of Examples 30-41, where the historical parameters include link speeds utilized in the one or more previous data transmissions and amounts of data transmitted in the previous data transmissions.

Example 43 includes the subject matter of any one of Examples 30-42, where determination of the change from the first link speed to the second link speed includes prediction of a particular data rate for transmission of the second data to the host processor, and the change is determined based on the data rate falling within a particular range of data rate values associated with the second link speed.

Example 44 includes the subject matter of Example 43, where the second link speed is higher than the first link speed, a change from the first link speed to the second link speed is associated with the particular range of data rate values, the particular range of data rate values is bounded by a first value and a second value, a change from the second link speed to the first link speed is associated with another range of data rate values, and the other range of data rate values overlaps with the particular range of data rate values in that one or more of the data rates in the other range of data rate values fall between the first and second values.

Example 45 includes the subject matter of any one of Examples 30-44, where the predictive parameters include one or more of radio access technology used to receive the second data over a wireless network, bandwidth available for receipt of the second data over the wireless network, and a transfer time for the transmission of the second data to the host processor.

Example 46 includes the subject matter of any one of Examples 30-45, further including one or more monitors to: detect the historic parameters; and detect the predictive parameters.

Example 47 includes the subject matter of any one of Examples 30-46, where instances of the inactive state correspond to aggregation periods on the data link.

Example 48 is a method including: identifying first data received over a cellular wireless network at a device; transmitting the first data from a modem of the device to a processor of the device over a point-to-point serial data link at a first one of a plurality of link speeds; transitioning the data link to an inactive state; determining historical parameters of transmission of data from the modem to the processor over the data link; determining predictive parameters associated with second data to be received after the first data; identifying the second data received over the cellular wireless network at the device, where at least a portion of the second data is received at the device while the data link is in the inactive state; and determining a change from the first link speed to a second one of the plurality of link speeds based on the historical parameters and the predictive parameters; and transitioning the data link to an active state operational at the second link speed to transmit the second data from the modem to the processor over the data link.

Example 49 includes the subject matter of Example 48, where the plurality of link speeds include a Peripheral Component Interconnection Express (PCIe) Generation 1 link speed, a PCIe Generation 2 link speed, a PCIe Generation 3 link speed, and a PCIe Generation 4 link speed.

Example 50 includes the subject matter of any one of Examples 48-49, where the change is determined based on a hysteresis model.

Example 51 includes the subject matter of any one of Examples 48-50, where the device includes a mobile device.

Example 52 includes the subject matter of Example 51, where the mobile device includes one of a laptop, smartphone, tablet, or wearable computing device.

Example 53 includes the subject matter of any one of Examples 48-52, where the first and second data include demodulated data from a cellular data network.

Example 54 includes the subject matter of any one of Examples 48-53, where the data link is compliant with a Peripheral Component Interconnection Express (PCIe)-based protocol.

Example 55 includes the subject matter of Example 54, where the active transmission state includes an L0 state and the low-power inactive state includes a PCIe L1.2 state.

Example 56 includes the subject matter of any one of Examples 48-55, where the data link includes a single transmit lane and a single receive lane.

Example 57 includes the subject matter of any one of Examples 48-56, where the historical parameters include link speeds utilized in the one or more previous data transmissions and amounts of data transmitted in the previous data transmissions.

Example 58 includes the subject matter of any one of Examples 48-57, where determination of the change from the first link speed to the second link speed includes prediction of a particular data rate for transmission of the second data to the host processor, and the change is determined based on the data rate falling within a particular range of data rate values associated with the second link speed.

Example 59 includes the subject matter of Example 58, where the second link speed is higher than the first link speed, a change from the first link speed to the second link speed is associated with the particular range of data rate values, the particular range of data rate values is bounded by a first value and a second value, a change from the second link speed to the first link speed is associated with another range of data rate values, and the other range of data rate values overlaps with the particular range of data rate values in that one or more of the data rates in the other range of data rate values fall between the first and second values.

Example 60 includes the subject matter of any one of Examples 48-59, where the predictive parameters include one or more of radio access technology used to receive the second data over a wireless network, bandwidth available for receipt of the second data over the wireless network, and a transfer time for the transmission of the second data to the host processor.

Example 61 includes the subject matter of any one of Examples 48-60, further including: detecting, at the modem, the historical parameters; and detecting, at the modem, the predictive parameters.

Example 62 includes the subject matter of any one of Examples 48-61, where instances of the inactive state correspond to aggregation periods on the data link.

Example 63 is a system including means to perform the method of any one of Examples 48-62.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
    a modem, wherein the modem is to connect to a host data processor over a serial point-to-point data link, and the modem comprises:
        a speed change manager to determine, based on the first and second parameters, a change from a first one of a plurality of defined link speeds used in a transmission of first data over the serial point-to-point data link to a second one of the plurality of link speeds for transmission of second data over the serial point-to-point data link, wherein the change is to be determined based on first parameters associated with one or more previous data transmissions from the modem to the host data processor over the serial point-to-point data link and second parameters associated with subsequent data to be sent over the serial point-to-point data link; and
        an interconnect protocol stack to:
            transition the serial, point-to-point data link from an active transmission state to a low power inactive state after the transmission of the first data; and
            transition the serial, point-to-point data link from the low power inactive state to the active transmission state to send the second data over the serial, point-to-point data link at the second link speed, wherein the second parameters comprise parameters associated with the second data.

2. The apparatus of claim 1, further comprising a mobile phone, and the mobile phone comprises the modem.

3. The apparatus of claim 1, wherein the first and second data comprise demodulated data from a cellular data network.

4. The apparatus of claim 1, wherein the serial point-to-point data link is compliant with a Peripheral Component Interconnect Express (PCIe)-based protocol.

5. The apparatus of claim 4, wherein the active transmission state comprises an L0 state and the low-power inactive state comprises a PCIe L1.2 state.

6. The apparatus of claim 4, wherein each link speed in the plurality of defined link speeds corresponds to a respective one of a plurality of generations of the PCIe-based protocol.

7. The apparatus of claim 4, wherein the serial point-to-point data link comprises a single transmit lane and a single receive lane.

8. The apparatus of claim 1, wherein the first parameters comprise link speeds utilized in the one or more previous data transmissions and amounts of data transmitted in the previous data transmissions.

9. The apparatus of claim 1, wherein determination of the change from the first link speed to the second link speed comprises prediction of a particular data rate for transmission of the second data to the host processor, and the change is determined based on the data rate falling within a particular range of data rate values associated with the second link speed.

10. The apparatus of claim 9, wherein the second link speed is higher than the first link speed, a change from the first link speed to the second link speed is associated with the particular range of data rate values, the particular range of data rate values is bounded by a first value and a second value, a change from the second link speed to the first link speed is associated with another range of data rate values, and the other range of data rate values overlaps with the particular range of data rate values in that one or more of the data rates in the other range of data rate values fall between the first and second values.

11. The apparatus of claim 1, wherein the second parameters comprise one or more of radio access technology used to receive the second data over a wireless network, bandwidth available for receipt of the second data over the wireless network, and a transfer time for the transmission of the second data to the host processor.

12. The apparatus of claim 1, further comprising one or more monitors to:
detect the first parameters; and
detect the second parameters.

13. The apparatus of claim 1, wherein the speed change manager is implemented at least in part in hardware of the modem.

14. At least one non-transitory machine-readable storage medium with instructions stored thereon, the instructions executable to cause a machine to:
identify first data received over a cellular wireless network at a device;
transmit the first data from a modem of the device to a processor of the device over a point-to-point serial data link at a first one of a plurality of link speeds;
transition the point-to-point serial data link to an inactive state;
determine historical parameters of transmission of data from the modem to the processor over the point-to-point serial data link;
determine predictive parameters associated with second data to be received after the first data;
identify the second data received over the cellular wireless network at the device, wherein at least a portion of the second data is received at the device while the point-to-point serial data link is in the inactive state; and
determine a change from the first link speed to a second one of the plurality of link speeds based on the historical parameters and the predictive parameters; and
transition the point-to-point serial data link to an active state operational at the second link speed to transmit the second data from the modem to the processor over the point-to-point serial data link.

15. The storage medium of claim 14, wherein the plurality of link speeds comprise a Peripheral Component Interconnect Express (PCIe) Generation 1 link speed, a PCIe Generation 2 link speed, a PCIe Generation 3 link speed, and a PCIe Generation 4 link speed.

16. The storage medium of claim 14, wherein the change is determined based on a hysteresis model.

17. A system comprising:
a mobile computing device comprising:
an antenna to receive data over a wireless network;
an application processor; and
a modem, wherein the modem is coupled to and is to communicate with the application processor over a serial point-to-point data link, and the modem comprises code, executable at the modem to:
transmit first data from the wireless network to the application processor over the serial point-to-point data link at a first one of a plurality of link speeds;
transition the serial point-to-point data link to an inactive state after transmission of the first data;
determine historical parameters of data transmissions from the modem to the application processor over the serial point-to-point data link;
determine predictive parameters associated with data to be transmitted by the modem to the application processor after transmission of the first data;
identify second data from the wireless network at the device, wherein at least a portion of the second data is received while the serial point-to-point data link is in the inactive state;
determine a change from the first link speed to a second one of the plurality of link speeds based on the historical parameters and the predictive parameters; and
transition the serial point-to-point data link to an active state, wherein the serial point-to-point data link is reactivated to be operational at the second link speed for transmission of the second data; and
transmit the second data from the modem to the processor over the serial point-to-point data link at the second link speed.

18. The system of claim 17, wherein the application processor transmits feedback data to the modem and the change is further determined based on the feedback data.

19. The system of claim 17, wherein the modem demodulates the first and second data prior to sending to the application processor.

20. The system of claim 17, wherein the mobile computing device comprises one of a laptop, smartphone, tablet, or wearable computing device.

* * * * *